US007591723B2

(12) United States Patent
Cregan et al.

(10) Patent No.: US 7,591,723 B2
(45) Date of Patent: Sep. 22, 2009

(54) GAMING DEVICE HAVING MECHANICAL INDICATOR WITH A MULTIPLE WIN SECTION

(75) Inventors: Karen M. Cregan, Reno, NV (US); Tonja M. Peterson, Reno, NV (US); Matthew E. Belger, N. Las Vegas, NV (US); Erick T. Ching, Reno, NV (US)

(73) Assignee: IGT, Reno, NV (US)

( * ) Notice: Subject to any disclaimer, the term of this patent is extended or adjusted under 35 U.S.C. 154(b) by 874 days.

(21) Appl. No.: 10/956,222

(22) Filed: Sep. 30, 2004

(65) Prior Publication Data

US 2006/0068875 A1 Mar. 30, 2006

(51) Int. Cl.
*A63F 13/00* (2006.01)
*A63F 13/02* (2006.01)

(52) U.S. Cl. ............................ 463/16; 463/20; 463/30; 463/31

(58) Field of Classification Search .................. 463/20, 463/16, 30, 31
See application file for complete search history.

(56) References Cited

U.S. PATENT DOCUMENTS 1,978,395 A 10/1934 Groetchen
2,545,644 A 3/1951 Benton et al.
3,420,525 A 1/1969 Waders
3,642,287 A 2/1972 Lally et al.
3,735,987 A 5/1973 Ohki
3,975,022 A 8/1976 Figueroa (Continued)

FOREIGN PATENT DOCUMENTS

AU 199716432 B2 9/1997

(Continued)

OTHER PUBLICATIONS

4DU Dice Unit Advertisement written by starpoint.uk.com, printed on Sep. 3, 2002.

(Continued)

*Primary Examiner*—Peter DungBa Vo
*Assistant Examiner*—Matthew D. Hoel
(74) *Attorney, Agent, or Firm*—K&L Gates LLP

(57) ABSTRACT

A gaming device includes a symbol generator having a plurality of adjacently arranged sections. A plurality of the sections are each associated with or display one or a plurality of characteristics. The sections associated with the characteristics are each associated with or display a symbol or an award. At least one of the sections is a designated section and is not initially associated with a characteristic. The designated section is operable to sequentially display one, more or each of the characteristics associated with the other non-designated sections. When the symbol generator indicates one of the sections that displays an award and is associated with a characteristic, the gaming device provides the player with the award associated with the section. When the symbol generator indicates the designated section, the gaming device sequentially associates or displays a plurality of the characteristics associated with the other sections with the designated section. That is, when the symbol generator indicates the designated section, the gaming device causes the designated section to display one, some or all of the different characteristics associated with the other sections. The gaming device accumulates the awards associated with the sections which have the same characteristic as the characteristic indicated by the designated section.

36 Claims, 20 Drawing Sheets

U.S. PATENT DOCUMENTS

| | | | | |
|---|---|---|---|---|
| 4,326,351 | A | 4/1982 | Heywood et al. | |
| 4,410,178 | A | 10/1983 | Partridge | |
| 4,621,814 | A | 11/1986 | Stepan et al. | |
| 4,624,459 | A | 11/1986 | Kaufman | |
| 4,695,053 | A | 9/1987 | Vazquez, Jr. et al. | |
| 4,712,799 | A | 12/1987 | Fraley | |
| 4,732,386 | A | 3/1988 | Rayfiel | |
| 4,871,171 | A | 10/1989 | Rivero et al. | |
| 5,058,893 | A | 10/1991 | Bertram et al. | |
| 5,152,529 | A | 10/1992 | Okada | |
| 5,205,555 | A | 4/1993 | Humano | |
| 5,259,616 | A | 11/1993 | Bergmann | |
| D344,296 | S | 2/1994 | McKay et al. | |
| 5,342,047 | A | 8/1994 | Heidel et al. | |
| 5,344,144 | A | 9/1994 | Canon | |
| 5,364,100 | A | 11/1994 | Ludlow et al. | |
| 5,395,111 | A | 3/1995 | Inoue | |
| 5,397,125 | A | 3/1995 | Adams | |
| 5,449,173 | A | 9/1995 | Thomas et al. | |
| 5,524,888 | A | 6/1996 | Heidel | |
| 5,560,603 | A | 10/1996 | Seelig et al. | |
| 5,584,763 | A | 12/1996 | Kelly et al. | |
| 5,584,764 | A | 12/1996 | Inoue | |
| 5,609,524 | A | 3/1997 | Inoue | |
| 5,647,798 | A | 7/1997 | Falciglia | |
| 5,664,998 | A | 9/1997 | Seelig et al. | |
| D392,340 | S | 3/1998 | DeSimone | |
| 5,722,891 | A | 3/1998 | Inoue | |
| 5,752,881 | A | 5/1998 | Inoue | |
| 5,769,716 | A | 6/1998 | Saffari et al. | |
| 5,772,509 | A | 6/1998 | Weiss | |
| 5,775,692 | A | 7/1998 | Watts et al. | |
| 5,779,544 | A | 7/1998 | Seelig et al. | |
| 5,788,573 | A | 8/1998 | Baerlocher et al. | |
| 5,823,874 | A | 10/1998 | Adams | |
| D400,597 | S | 11/1998 | Hedrick et al. | |
| 5,833,536 | A | 11/1998 | Davids et al. | |
| 5,848,932 | A | 12/1998 | Adams | |
| 5,851,148 | A | 12/1998 | Brune et al. | |
| D404,084 | S | 1/1999 | Hedrick et al. | |
| D406,615 | S | 3/1999 | Griswold et al. | |
| D406,865 | S | 3/1999 | Heidel | |
| 5,882,261 | A | 3/1999 | Adams | |
| 5,890,962 | A | 4/1999 | Takemoto | |
| 5,902,184 | A | 5/1999 | Bennett et al. | |
| 5,911,418 | A | 6/1999 | Adams et al. | |
| 5,919,088 | A | 7/1999 | Weiss | |
| 5,927,714 | A | 7/1999 | Kaplan | |
| 5,934,672 | A | 8/1999 | Sines et al. | |
| 5,935,002 | A | 8/1999 | Falciglia | |
| 5,947,820 | A | 9/1999 | Morro et al. | |
| 5,951,397 | A | 9/1999 | Dickinson | |
| 5,976,015 | A | 11/1999 | Seelig et al. | |
| 5,980,384 | A | 11/1999 | Barrie | |
| 5,984,782 | A | 11/1999 | Inoue | |
| 5,997,400 | A | 12/1999 | Seelig et al. | |
| 5,997,401 | A | 12/1999 | Crawford | |
| 6,004,207 | A | 12/1999 | Wilson, Jr. et al. | |
| 6,015,346 | A | 1/2000 | Bennett | |
| 6,033,307 | A | 3/2000 | Vancura | |
| 6,036,187 | A | 3/2000 | Schaede | |
| 6,036,189 | A | 3/2000 | Gomez et al. | |
| 6,050,895 | A | 4/2000 | Luciano, Jr. et al. | |
| 6,056,642 | A | 5/2000 | Bennett | |
| 6,059,289 | A | 5/2000 | Vancura | |
| 6,059,658 | A | 5/2000 | Mangano et al. | |
| 6,062,979 | A | 5/2000 | Inoue | |
| 6,062,980 | A | 5/2000 | Luciano | |
| 6,071,192 | A | 6/2000 | Weiss | |
| 6,086,066 | A | 7/2000 | Takeuchi et al. | |
| 6,089,976 | A | 7/2000 | Schneider et al. | |
| 6,089,977 | A | 7/2000 | Bennett | |
| 6,089,978 | A | 7/2000 | Adams | |
| 6,102,798 | A | 8/2000 | Bennett | |
| 6,105,962 | A | 8/2000 | Malavazos et al. | |
| 6,113,098 | A | 9/2000 | Adams | |
| 6,120,031 | A | 9/2000 | Adams | |
| 6,126,542 | A | 10/2000 | Fier | |
| 6,142,873 | A | 11/2000 | Weiss et al. | |
| 6,142,874 | A | 11/2000 | Kodachi et al. | |
| 6,146,273 | A | 11/2000 | Olsen | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,173,955 | B1 | 1/2001 | Perrie et al. | |
| 6,190,254 | B1 | 2/2001 | Bennett | |
| 6,190,255 | B1 | 2/2001 | Thomas et al. | |
| 6,203,429 | B1 | 3/2001 | Demar et al. | |
| D441,030 | S | 4/2001 | Seelig et al. | |
| D441,031 | S | 4/2001 | Seelig et al. | |
| 6,210,279 | B1 | 4/2001 | Dickinson | |
| 6,213,876 | B1 | 4/2001 | Moore, Jr. | |
| 6,220,593 | B1 | 4/2001 | Pierce et al. | |
| 6,224,483 | B1 | 5/2001 | Mayeroff | |
| 6,227,971 | B1 | 5/2001 | Weiss | |
| 6,231,442 | B1 | 5/2001 | Mayeroff | |
| 6,254,481 | B1 | 7/2001 | Jaffe | |
| 6,261,177 | B1 | 7/2001 | Bennett | |
| 6,267,669 | B1 | 7/2001 | Luciano, Jr. et al. | |
| 6,270,408 | B1 * | 8/2001 | Sakamoto et al. | 463/20 |
| 6,270,412 | B1 | 8/2001 | Crawford et al. | |
| 6,302,790 | B1 | 10/2001 | Brossard | |
| 6,305,686 | B1 | 10/2001 | Perrie et al. | |
| 6,309,300 | B1 | 10/2001 | Glavich | |
| 6,315,660 | B1 | 11/2001 | DeMar et al. | |
| 6,315,663 | B1 | 11/2001 | Sakamoto | |
| 6,315,664 | B1 | 11/2001 | Baerlocher et al. | |
| 6,319,124 | B1 | 11/2001 | Baerlocher et al. | |
| 6,328,649 | B1 | 12/2001 | Randall et al. | |
| 6,334,814 | B1 | 1/2002 | Adams | |
| 6,336,863 | B1 | 1/2002 | Baerlocher et al. | |
| 6,338,678 | B1 | 1/2002 | Seelig et al. | |
| 6,340,158 | B2 | 1/2002 | Pierce et al. | |
| 6,346,043 | B1 | 2/2002 | Colin et al. | |
| 6,347,996 | B1 | 2/2002 | Gilmore et al. | |
| D458,311 | S | 6/2002 | Seelig et al. | |
| 6,398,218 | B1 | 6/2002 | Vancura | |
| 6,398,220 | B1 | 6/2002 | Inoue | |
| D461,207 | S | 8/2002 | Seelig et al. | |
| D462,397 | S | 9/2002 | Baker et al. | |
| 6,450,884 | B1 | 9/2002 | Seelig et al. | |
| 6,464,582 | B1 | 10/2002 | Baerlocher et al. | |
| 6,481,713 | B2 | 11/2002 | Perrie et al. | |
| 6,482,089 | B2 | 11/2002 | DeMar et al. | |
| 6,533,660 | B2 | 3/2003 | Seelig et al. | |
| 6,537,152 | B2 | 3/2003 | Seelig et al. | |
| 6,569,015 | B1 | 5/2003 | Baerlocher et al. | |
| 6,582,307 | B2 | 6/2003 | Webb | |
| 6,602,137 | B2 | 8/2003 | Kaminkow et al. | |
| 6,609,971 | B2 | 8/2003 | Vancura | |
| 6,609,972 | B2 | 8/2003 | Seelig et al. | |
| 6,612,574 | B1 | 9/2003 | Cole et al. | |
| 6,612,927 | B1 * | 9/2003 | Slomiany et al. | 463/16 |
| 6,634,941 | B2 * | 10/2003 | Olive | 463/16 |
| 6,634,945 | B2 | 10/2003 | Glavich et al. | |
| 6,672,960 | B1 | 1/2004 | B-Jensen | |
| 6,712,694 | B1 | 3/2004 | Nordman | |
| 6,715,756 | B2 | 4/2004 | Inoue | |
| 6,726,204 | B2 | 4/2004 | Inoue | |
| D496,968 | S | 10/2004 | Baerlocher | |
| 6,817,944 | B2 | 11/2004 | Kaminkow et al. | |

| | | | | |
|---|---|---|---|---|
| 6,869,357 | B2 * | 3/2005 | Adams et al. | 463/16 |
| 6,958,013 | B2 | 10/2005 | Miereau et al. | |
| 7,011,581 | B2 | 3/2006 | Cole et al. | |
| 7,081,050 | B2 | 7/2006 | Tarantino | |
| 2001/0024971 | A1 | 9/2001 | Brossard | |
| 2001/0031658 | A1 * | 10/2001 | Ozaki et al. | 463/16 |
| 2001/0054794 | A1 | 12/2001 | Cole et al. | |
| 2002/0025844 | A1 | 2/2002 | Casey et al. | |
| 2002/0045475 | A1 | 4/2002 | Glavich et al. | |
| 2002/0094862 | A1 | 7/2002 | Inoue | |
| 2002/0142829 | A1 | 10/2002 | Inoue | |
| 2003/0040355 | A1 | 2/2003 | Baerlocher | |
| 2003/0040358 | A1 | 2/2003 | Rothkranz et al. | |
| 2003/0064790 | A1 | 4/2003 | Hughs-Baird et al. | |
| 2003/0078089 | A1 | 4/2003 | Gary et al. | |
| 2003/0232643 | A1 | 12/2003 | Inoue | |
| 2004/0000754 | A1 | 1/2004 | Inoue | |
| 2004/0009807 | A1 | 1/2004 | Miller et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0018866 | A1 | 1/2004 | Inoue | |
| 2004/0023710 | A1 | 2/2004 | McGahn et al. | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0041340 | A1 | 3/2004 | Inoue | |
| 2004/0053658 | A1 | 3/2004 | Rothranz | |
| 2004/0053659 | A1 | 3/2004 | Rothkranz et al. | |
| 2004/0053670 | A1 | 3/2004 | Rothkranz et al. | |
| 2004/0053671 | A1 | 3/2004 | Nordman | |
| 2004/0053687 | A1 | 3/2004 | Nordman et al. | |
| 2004/0082373 | A1 | 4/2004 | Cole et al. | |
| 2004/0121840 | A1 | 6/2004 | Rosander et al. | |
| 2004/0150161 | A1 | 8/2004 | Inoue | |
| 2004/0155399 | A1 | 8/2004 | Inoue | |
| 2004/0157658 | A1 | 8/2004 | Rothkranz | |
| 2004/0180715 | A1 | 9/2004 | Nordman | |
| 2004/0183251 | A1 | 9/2004 | Inoue | |
| 2005/0009595 | A1 * | 1/2005 | Boyd et al. | 463/16 |

FOREIGN PATENT DOCUMENTS

| | | | | |
|---|---|---|---|---|
| AU | A-5032/96 | | | 10/1997 |
| DE | 38 11 301 | A1 | | 10/1988 |
| EP | 0798676 | A1 | | 10/1997 |
| EP | 0926645 | A2 | | 6/1999 |
| EP | 0944030 | A2 | | 9/1999 |
| EP | 0945837 | A2 | | 9/1999 |
| EP | 1003138 | A | | 5/2000 |
| GB | 912685 | | | 12/1962 |
| GB | 2 083 936 | A | | 3/1982 |
| GB | 2 096 376 | A | | 10/1982 |
| GB | 2 097 160 | A | | 10/1982 |
| GB | 2 117 155 | A | | 10/1983 |
| GB | 2 170 636 | A | | 8/1986 |
| GB | 2 183 882 | A | | 6/1987 |
| GB | 2 201 821 | A | | 9/1987 |
| GB | 37 00 861 | A1 | | 7/1988 |
| GB | 2 226 436 | A | | 6/1990 |
| GB | 2 328 311 | A | | 2/1999 |
| GB | 2 383 668 | A | | 11/2001 |
| GB | 2 365 191 | A | * | 2/2002 |
| JP | 2002-320703 | | | 11/2002 |
| WO | WO 01/19476 | | | 3/2001 |

OTHER PUBLICATIONS

American Bandstand Brochure written by Anchor Games, published in 2001.
Bally Live! Fabulous Global Gaming Expo Advertisement, written by Bally Gaming Systems, published in 2002.
Barn Yard Article in Strictly Slots, published in Mar. 2002.
Barn Yard Advertisement written by Aristocrat, published prior to Sep. 30, 2004.
Big Shot!™ Advertisement published by Aristocrat Technologies, Inc., published in 2002.
Big Top Keno Advertisement published by Aristocrat Technologies, Inc., published in 2000.
Bingo Advertisement written by Casino Data System, published in 1998.
Bonus Roulette Brochure written by F. Franco, published prior to Sep. 11, 2003.
Bonus Times Article written by Strictly Slots, published in Jul. 2000.
Buck's Roulette Brochure written by R. Franco, published prior to Sep. 11, 2003.
Chariot's of Fortune Brochure written by R. Franco, published prior to Sep. 11, 2003.
Classic Pot of Gold Brochure written by Ace Coin Equipment Ltd., published prior to Sep. 11, 2003.
Crazy Fruits Article written by Strictly Slots, published in 2001.
Cyberdyne Gaming Brochure written by Cyberdyne Gaming, published prior to Sep. 11, 2003.
Double Diamond Girls Advertisement, written by A.C. Coin and Slot Services Company, published prior to Sep. 11, 2003.
Double Dice Advertisement, written by Errel products, published prior to Sep. 2002.
Elvira® Mistress of the Dark™ Advertisement written by IGT, published in 2002.
Elvis Hits Advertisement written by IGT, published in 1999.
Enchanted Unicorn—Unicorn Bonus Advertisements written by IGT, published in 2001.
Evel Knievel Advertisement written by IGT, published in 2001.
Five Card Instant Bingo Advertisement , written by IGT, published in 2000.
Fortune Cookie Advertisement written by IGT, published in 2000.
Holy Smoke Brochure written by Impulse Gaming Ltd., published prior to Sep. 11, 2003.
Honeymooners Advertisement, written by AC Coin & Slot, published in 2002.
Jack and the Beanstalk™ Brochure written by AC Coin & Slot, published prior to Sep. 11, 2003.
Jackpot Hotline Advertisement, written by AC Coin and Slot, published prior to Sep. 11, 2003.
King of the Grill™ Brochure written by AC Coin & Slot, published prior to Sep. 11, 2003.
Lemons, Cherries and Bell-Fruit-Gum written by Richard M. Bueschel, pp. 39-41, 64, 70, 137, 149-150, 195-196 and 251, published in 1995.
Line-Up Brochure written by AC Coin & Slot, published prior to Sep. 11, 2003.
Little Green Men Jr.™ Advertisement written by AC Coin & Slot, published prior to Sep. 11, 2003.
Little Green Men Jr.™ Article written by Strictly Slots, published in Feb 2003.
Mayan Wheel of Gold Advertisement, written by Anchor Games, published prior to 2002.
Mega Jackpots Advertisement, written by IGT, published in Winter 1997.
Mill Vest Pocket, written by Horizontal Spinning Reels, published in 1940.
Miss America Brochure written by AC Coin & Slot, published prior to Sep. 11, 2003.
Mix and Match Article written by Strictly Slots, published in Apr. 2002.
Mix and Match Advertisement published by AC Coin & Slot, published prior to Sep. 11, 2003.
Money Grab Article written by Strictly Slots, published in Apr. 2001.
Money to Burn Advertisement written by WMS Gaming, Inc., published prior to Sep. 30, 2004.
Monster Match Game Description by Strictly Slots, published by AC Coin & Slots prior to Sep. 9, 2003.
Monster Match Article, published by Strictly Slots, published in Jan. 2002.
Musical Cherries Advertisement, written by Acres Gaming, published in 2000.

On the Money! Article written by Strictly Slots, published in Dec. 2000.
Payout!™ Advertisement written by CDS Corp., www.csds.com/Gaming/Products/g Payout.htm, printed on Jan. 15, 2001.
Payout!™ Article written by Casino Data Systems, published prior to Sep. 11, 2003.
Pick a Prize Brochure written by Acres Gaming Incorporated, published prior to 2001.
Pick-n-Pop Advertisement, written by Anchor Games, published in 1999.
Power Slotto Brochure published by AC Coin & Slot prior to 2002.
Press Your Luck Brochure published by AC Coin & Slot prior to 2002.
Quick Pick Paytime Brochure written by Acres Gaming Incorporated, published prior to 2001.
R&B™ Brochure published by AC Coin & Slot, published prior to Sep. 11, 2003.
Reel Dice Advertisement written by Gerber & Glass, published in 1936.
Reel'em in Advertisement, written by WMS Gaming, Inc., printed on Jan. 15, 2001.
Reel'em in Advertisement, written by WMS Gaming, Inc., published on Sep. 10, 2001.
Regis Cash Club Advertisement written by IGT, published in 2000.
Royal Roulette Brochure written by Impulse Gaming Ltd., published prior to Sep. 11, 2003.
Silver City Roundup Advertisement, written by AC Coin & Slot, published prior to Sep. 2002.
Slot Machine Buyer's Handbook, A Consumer's Guide to Slot Machines written by David L. Saul and Daniel R. Mead, published in 1998.
Slot Machines A Pictorial History of the First 100 Years, 5th edition written by Marshall Fey, published in 1983-1997.
Slot Machines and Coin-Op Games written by Bill Kurtz, pp. 16, 65, 105 and 111, published in 1991.
Slot Machines on Parade, 1st edition written by Robert N. Geddes and illustrated by Daniel R. Mead, published in 1980.
Spin-a-Lot Advertisement, written by Acres Gaming, Inc., published in 2000.
Take Your Pick Article, written by Strictly Slots, published in Mar. 2001.
Take Your Pick Advertisement written by IGT/Anchor Gaming, published in 1999, on or before Dec. thereof.
Texas Tea Advertisement written by IGT, published in 2000.
Top Dollar Advertisement, written by IGT, published in 1998.
Uno Game Description by C. R. Light & Co., published in 1900.
Uno written by Mattel, Inc., published in 1998.
Vision Series™/Good Times™ Brochure written by IGT, published in 1999, on or before Dec. thereof.
Wheel & Deal Article, written by Strictly Slots, published in Dec. 2001.
Wheel of Fortune Advertisement, written by Barcrest Ltd., published in 1995.
Wheel of Fortune Advertisements (4), written by IGT, published prior to 2002.
X Factor Brochure and Website Page written by WMS Gaming, Inc., published in 1998, on or before Dec. thereof.
Yahtzee Bonus Advertisement written by Mikohn, published in 1999.

* cited by examiner

GAMING DEVICE HAVING MECHANICAL INDICATOR WITH A MULTIPLE WIN SECTION

CROSS REFERENCE TO RELATED APPLICATIONS

This application relates to the following copending commonly owned patent applications: "GAMING DEVICE HAVING MULTIPLE INTERACTING INDEPENDENTLY OPERABLE WHEELS," Ser. No. 10/953,822, and "GAMING DEVICE HAVING AWARD POSITIONS WITH ASSOCIATED CHARACTERISTICS," Ser. No. 10/657,588.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one known method for enhancing player enjoyment and excitement.

Gaming devices having bonus games generally employ a triggering event that occurs during the operation of the base game of the gaming device. The triggering event temporarily stalls or halts the base game play and enables a player to enter a second, different game, which is the secondary or bonus game. The player plays the bonus game, likely receives an award, and returns to the base game.

Certain gaming machines include one or more wheels which display bonus awards. U.S. Pat. Nos. 5,882,261; 5,911,418; 6,089,918; 6,334,814; 6,605,000 and 6,663,488 disclose examples of such wheels.

Another bonus game is described in U.S. Pat. No. 6,224,483 which discloses a gaming device having a primary game including several reels with symbols. Multiple paylines are associated with the reels. A bonus game is initiated when the player obtains a specific combination of symbols on the reels. In the bonus game, a wheel including several awards spins a plurality of times. The number of spins of the wheel provided to the player in the bonus game is based on the number of paylines that the player played in the primary game, the number of credits wagered on the paylines in the primary game or the specific symbol combination or combinations which occurred on the reels in the primary game. The bonus game ends when the player has no spins remaining. The player receives the total accumulated awards from the spins of the wheel in the bonus game.

Gaming devices that increase the opportunities to obtain awards and increase the size of the awards are desirable. Players are attracted to games that provide several larger awards and the opportunity to obtain a very large award. Therefore, to increase player enjoyment and excitement, it is desirable to provide new games for gaming devices.

SUMMARY OF THE INVENTION

The present invention relates in general to a gaming device, and more particularly to a gaming device having a game including a symbol generator having at least one multiple win section such as a win all section.

In one embodiment of the present invention, the gaming device includes a plurality of symbol groups or award groups which each include at least one and preferably a plurality of award symbols or awards. The gaming device includes at least one designated multiple win symbol that is not initially associated with any of the symbol groups. When the gaming device generates one of the award symbols or awards in one of the groups, the gaming device provides the player with the value of the award symbol or award. When the gaming device generates the designated multiple win symbol, the gaming device associates the designated symbol with at least one of the symbol groups. In other words, after the generation of the multiple win symbol, the gaming device selects at least one of the plurality of groups to determine the award for the multiple win. In one embodiment, the designated multiple win symbol can be associated with one, more or each of the symbol groups to determine the award for the multiple win. When the gaming device generates the designated multiple win symbol, the gaming device associates the designated multiple win symbol with one of the symbol groups and then provides the player an accumulated award based on the symbols of that group which is associated with the designated multiple win symbol. In one embodiment, the designated multiple win symbol can be sequentially associated with one, more or each of the characteristics associated with the other non-designated symbols to designate the award groups before indicating one of the award groups.

In one embodiment, the symbol generator includes a plurality of sections. A plurality of the sections are each associated with a non-designated award symbol. At least one of the sections is associated with a designated multiple win symbol. The award symbols are each a color and the symbols are sorted in the symbols groups based on the color. For instance, the award symbols can include color A, color B and color C. The designated multiple win section is operable to display color A, color B and color C. When the designated multiple win section is indicated or generated, the gaming device causes the designated multiple win section to sequentially display color A, color B and color C. The gaming device selects one of the colors and stops changing the colors to indicate the selected color for the designated multiple win section. The gaming device determines an outcome to provide to the player based on the color associated with the designated multiple win section and one, more or preferably all of the other sections with the same color ultimately indicated by or associated with the designated multiple win section. The gaming device accumulates the awards associated with the sections which have the same color as the color displayed on the designated multiple win section. The gaming device provides the accumulated award to the player.

In one embodiment, the gaming device includes a symbol generator such as a mechanical wheel with a plurality of adjacently arranged sections. A plurality of the sections are associated with or display at least one symbol and a characteristic. The symbols are grouped according to the characteristics. In this embodiment, the symbols are numerical values and the characteristics are colors associated with the entire section, part of the section or the numerical value. A designated section displays a multiple win symbol such as a win all symbol. This section is not associated with a characteristic and therefore does not display a color. Rather, this multiple win section is transparent or translucent. When the multiple win section is indicated, suitable illumination devices such as a plurality of multi-colored light emitting diodes (LED's) are used to illuminate the section with the appropriated colors.

In one embodiment, the gaming device spins or enables the player to spin the wheel a predetermined number of times. When the gaming device indicates one of the sections associated with a numerical value, the gaming device accumulates the values and spins or enables the player to spin the wheel again. When the gaming device indicates the designated multiple win or win all section, the gaming device causes the illumination of the multi-colored LED's, thereby illuminating the multiple win or win all section in a color. The gaming device illuminates the multiple win or win all section to sequentially display the colors of the other sections. The gaming device continues changing the color of the multiple win or win all section with the multi-colored LED's. The gaming device stops the cycling of the multi-colored LED's to indicate or display one color for the multiple win or win all section. This color determines the award provided to a player. The gaming device accumulates the values of the sections associated with or displaying the same color as the multiple win or win all section. In one embodiment, the gaming device provides the player with an award based on the values of the indicated sections and any other values accumulated in the game. It should also be appreciated that when the multiple win or win all section is generated or indicated, multiple groups (i.e., two or more) may be selected for providing awards to the player.

In another embodiment, the gaming device changes the color of the multiple win or win all symbol and not the entire multiple win or win all section and provides the player with an accumulated award based on the color of the multiple win or win all symbol. In one embodiment, the multiple win section determines the award based on a plurality of the displayed characteristics. For example, the designated section displays or is associated with two of the colors. In such embodiment, the gaming device accumulates the awards of any of the sections associated with each of the colors.

In another embodiment, the gaming device provides a symbol generator and an indicator. In this embodiment, the symbol generator includes a transparent or translucent wheel with a plurality of adjacently arranged sections. A plurality of sections are associated with awards and one of the sections is designated as a multiple win or win all section. The gaming device is operable to change the colors of each of the sections of the wheel. The gaming device provides a player with a number of spins of the wheel and enables the player to spin the wheel the predetermined number of times. The gaming device accumulates the values associated with the indicated sections. When the gaming device indicates the multiple win or win all section, the gaming device causes the multiple win or win all symbol to display or associate a plurality of characteristics with the multiple win or win all section. In one embodiment, the gaming device sequentially displays one color and then a next color to the player. The gaming device stops changing the color of the multiple win or win all section to determine, indicate or display one color. The gaming device then begins associating a color with the other sections or symbols. The gaming device may change the color of the displayed symbols, part of the sections, all of the sections, the edges of the sections, or any combination thereof. In one embodiment, the gaming device changes the color of the indicated sections. The gaming device stops changing the color of the sections to indicate a color for each section. The gaming device accumulates the values of any sections that display or are associated with the same color as the multiple win or win all section. In one embodiment, the gaming device provides this accumulated value to a player.

In one embodiment, the gaming device changes the characteristic of one section at a time (i.e., sequentially). In another embodiment, the gaming device changes the characteristics of more than one section at the same time (i.e., simultaneously). In one embodiment, the characteristics are a plurality of different colors. In another embodiment, the characteristics are symbols. In one embodiment, the gaming device causes the symbols to change colors. In another embodiment, the gaming devices cause the sections to change colors. In one embodiment, the accumulated award can be determined by more than one characteristic. For example, a plurality of the sections display a numerical symbol, an alphabetical symbol and a color. When the gaming device indicates the designated symbol, it associates a color and a letter with the designated symbol. The gaming device accumulates the values of the sections with either the same color or the same letter as the designated section. In another embodiment, the gaming device only accumulates the values of the sections with both the same color and the same alphabetical symbol as the designated section. It should be appreciated that the gaming device may indicate a symbol directly or indicate the symbol by indicating the section associated with the symbol, thereby indicating the symbol.

The game of the present invention may be implemented in a base game or a bonus game. It should be appreciated that the symbol generator may be one or more reels, wheels, dice or any other suitable type of symbol generator. It should be appreciated that the symbols are not limited to award symbols and multiple win or win all symbols but may be any suitable symbol, image, characteristic or other suitable indicia. The symbols may include free spin symbols, lose a spin symbols or any other functional game symbols. It should also be appreciated that the characteristics may be any suitable characteristics, including but not limited to shapes, colors, sizes, patterns, symbols or any other suitable characteristic.

It is therefore an advantage of the present invention to provide a gaming device having a symbol generator that provides awards to players.

It is a further advantage of the present invention to provide a gaming device which includes a symbol generator which includes an accumulation game.

It is a further advantage of the present invention to provide a gaming device which includes a symbol generator with a multiple win such as a section operable to display a changing characteristic.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Figure 1A:
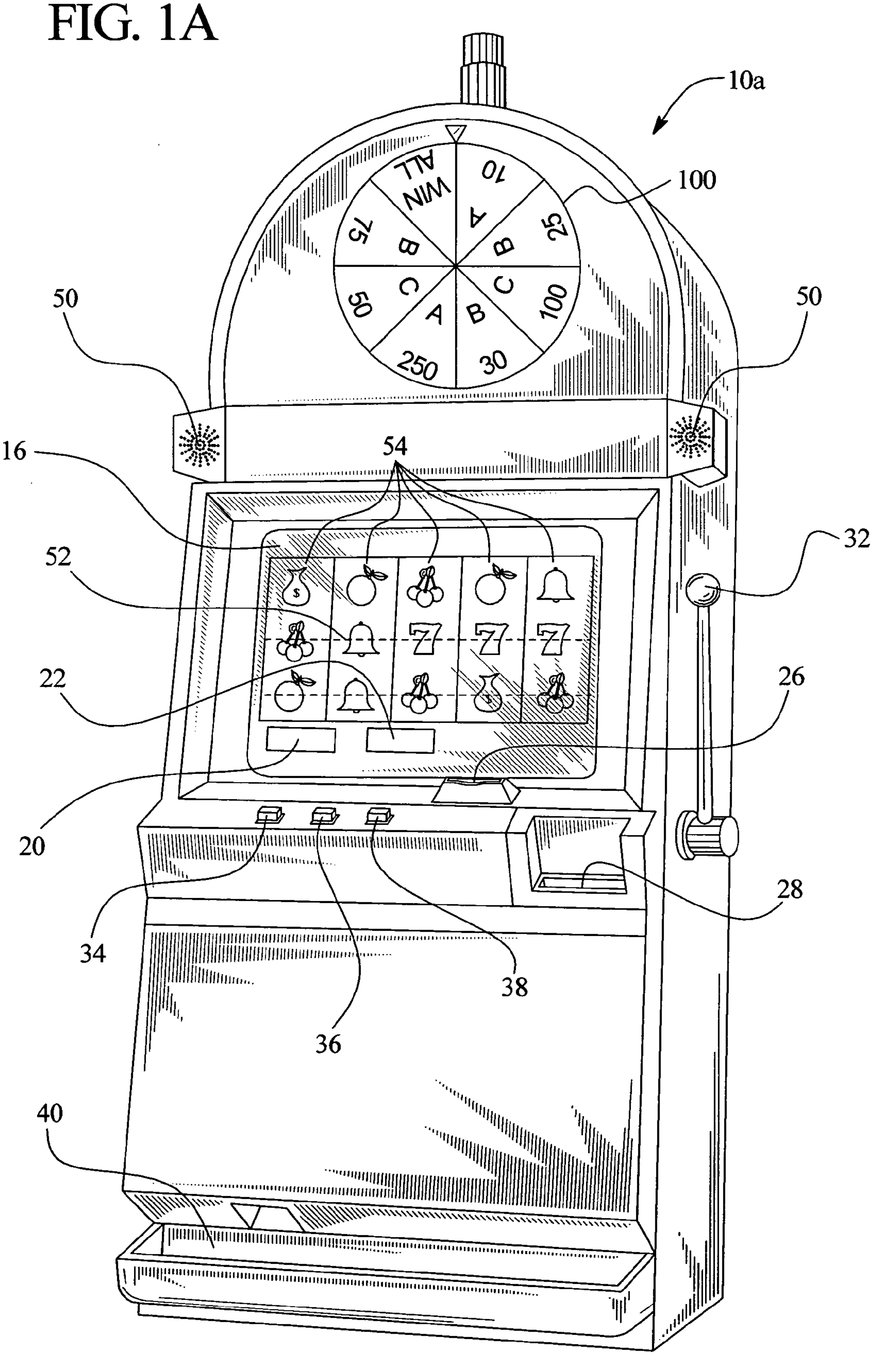
FIG. 1A is a front perspective view of one embodiment of the gaming device of the present invention.
Figure 1B:
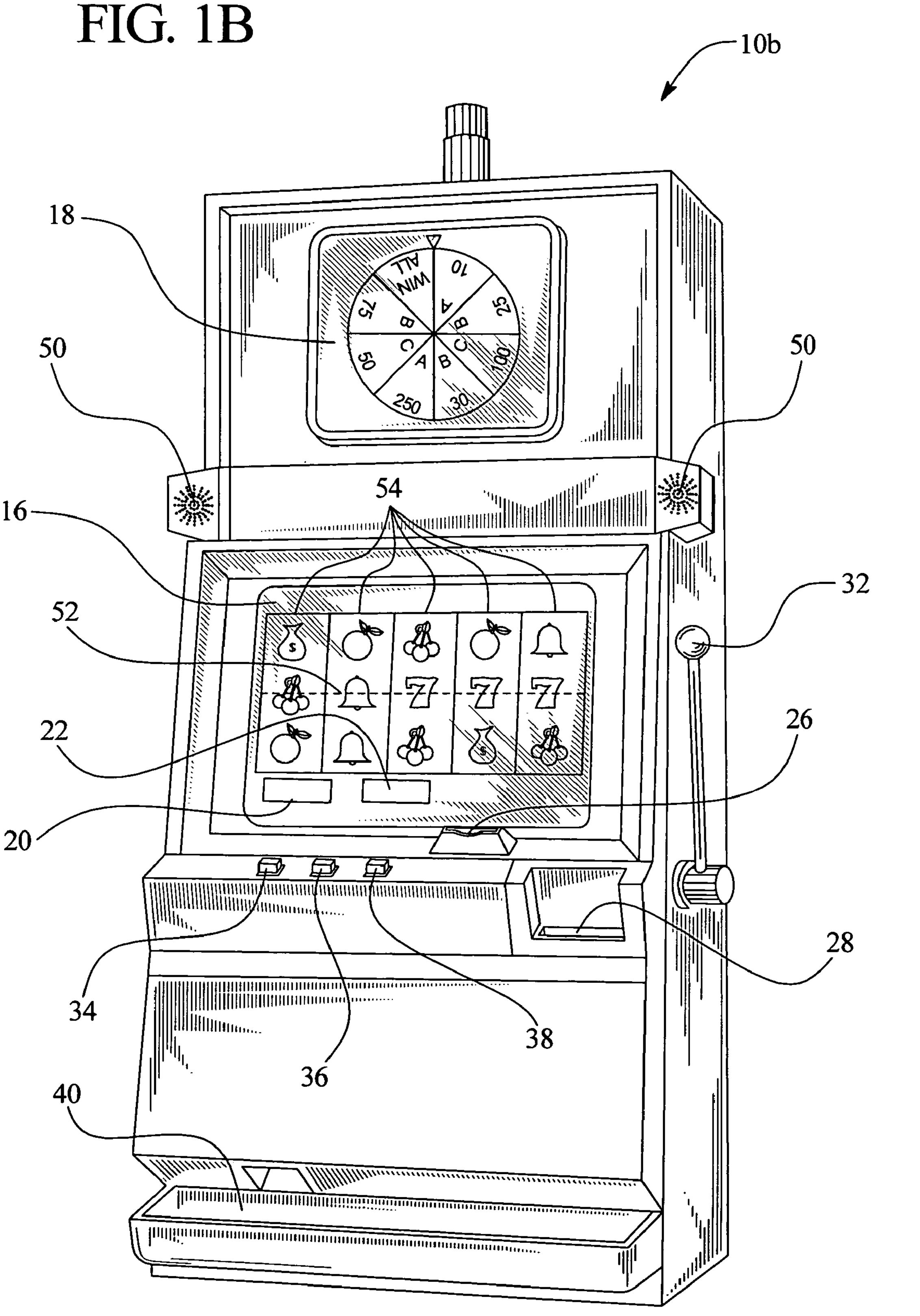
FIG. 1B is a front perspective of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
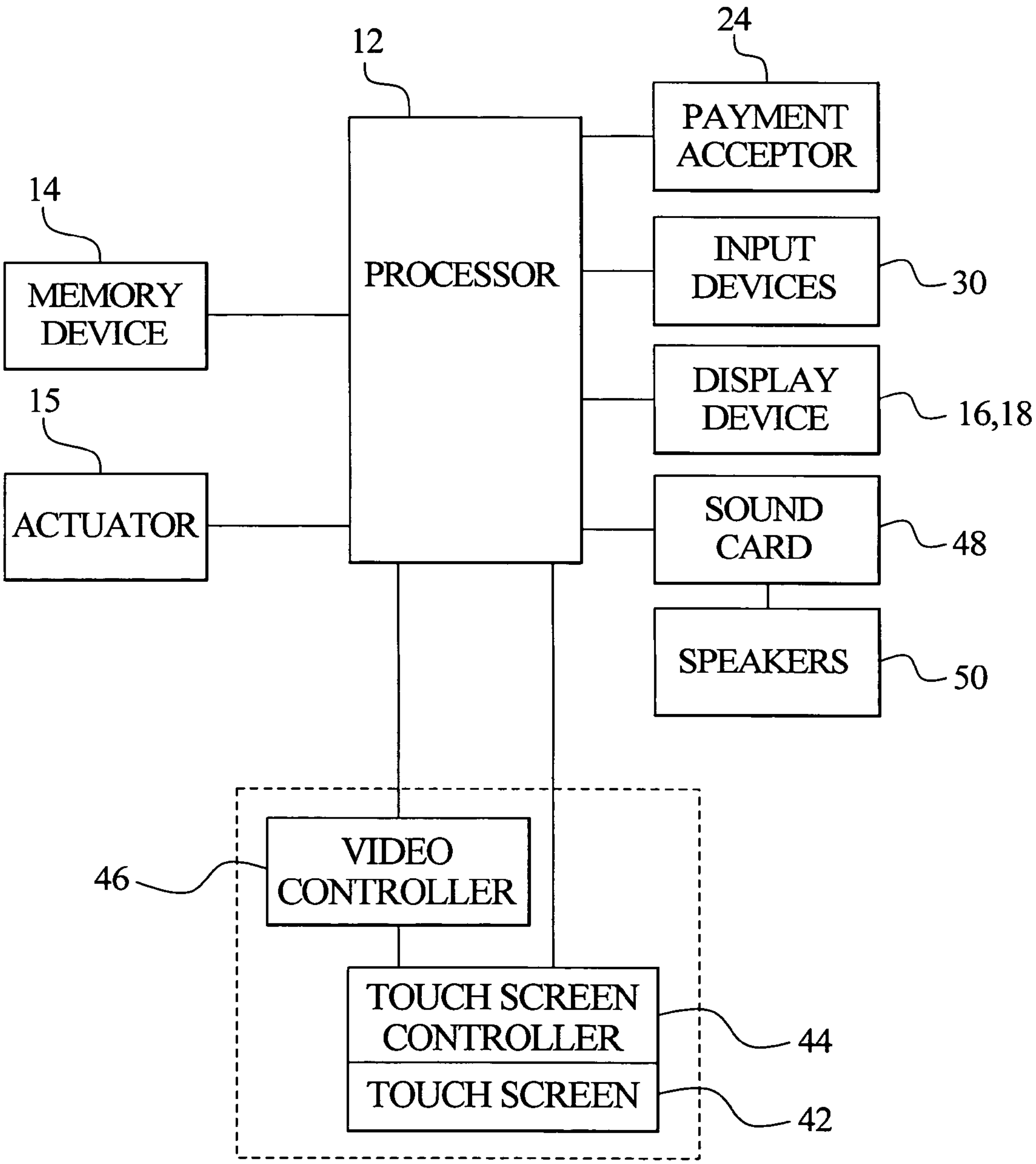
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables at least a portion of the primary or secondary game to be played at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle. In one embodiment, an LED display or any other suitable display is operable to illuminate one or more sections of the symbol generator. In another embodiment, an LED display or any other suitable display is operable to illuminate a portion of one or more of the sections or symbols of the symbol generator. In yet another embodiment, an LED display or any other suitable display is operable to illuminate an indicator of the symbol generator.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

In one embodiment, as illustrated in FIGS. 1A and 1B, the gaming device includes at least one electromechanical symbol generator, such as a rotatable wheel which is attached to the housing of the gaming device. Each rotatable wheel includes a plurality of sections wherein each section displays a symbol, award, image or other suitable indicia. Each rotatable wheel is associated with and connected to a suitable actuator or motor which is controlled by the processor. The associated actuator or motor is adapted to drive or rotate the rotatable wheel in a clockwise or counter-clockwise direction. In an alternative embodiment, the gaming device includes any suitable electromechanical device which preferably moves one or more mechanical objects, such as one or more mechanical reels or dice, configured to display at least one and preferably a plurality of games or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern.

In one embodiment, a base or primary game may be a poker game wherein the gaming device enables the player to play a conventional game of video poker and initially deals five cards all face up from a virtual deck of fifty-two cards. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game, rather they must win or earn entry through play of the primary game and thus, play of the primary game is encouraged. In another embodiment, qualification of the bonus or secondary game could be accomplished through a simple "buy in" by the player if, for example, the player has been unsuccessful at qualifying through other specified activities.

Figure 2B:
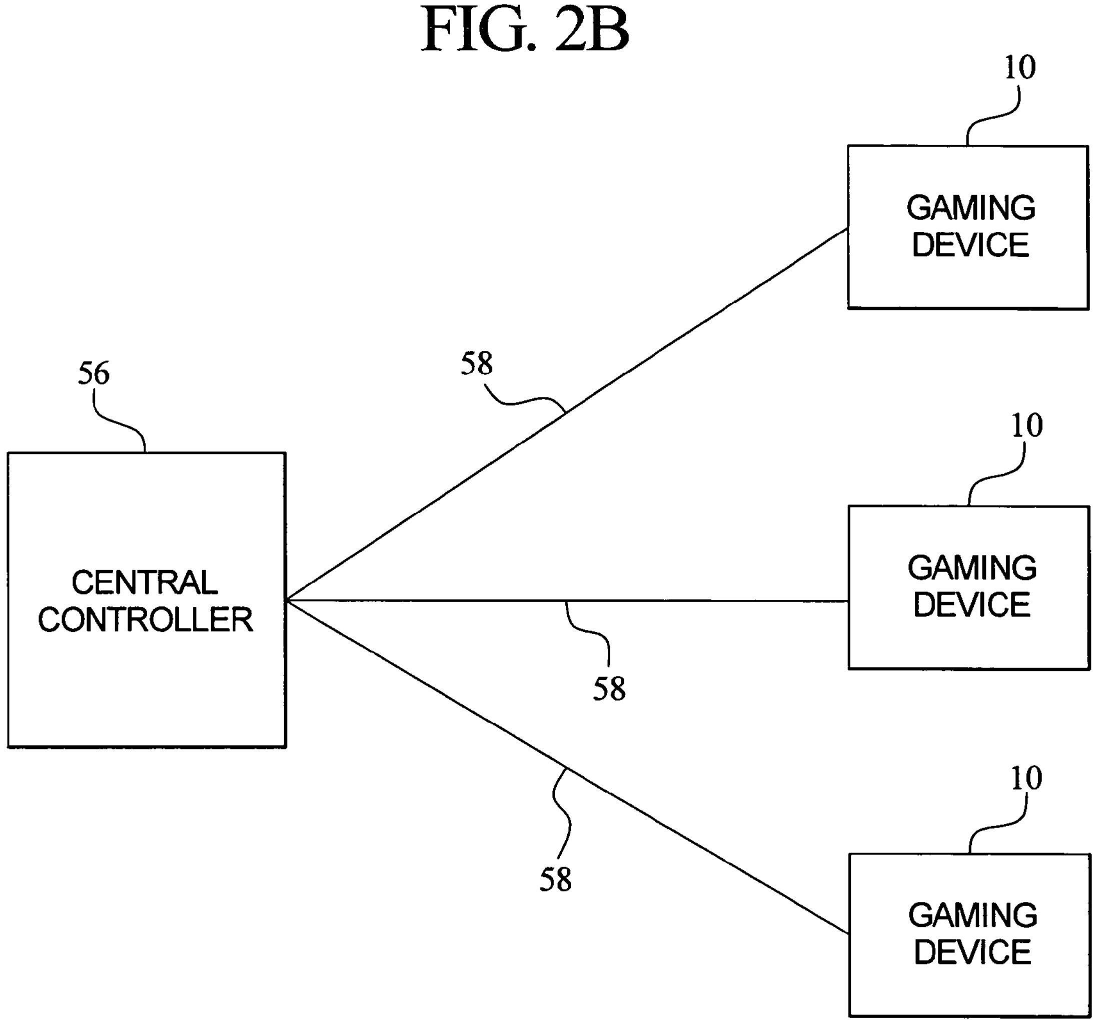
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices is in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Symbol Generator with Multiple Win or Win all Section

Referring now to FIG. 3, in one embodiment, the gaming device includes a symbol generator such as wheel 100. The wheel 100 includes a plurality of adjacent sections 104*a*, 104*b*, 104*c*, 104*d*, 104*e*, 104*f*, 104*g* and 104*h*. Each of the sections is associated with or displays a symbol. In the illustrated embodiment, the plurality of the symbols are award values or numerical values 106*a*, 106*b*, 106*c*, 106*d*, 106*e*, 106*f* and 106*g*. In one embodiment, each of the sections that displays one of the numerical values also includes or displays a characteristic. The symbols or sections are associated with groups according to the characteristics of each section. At least one of the sections of the symbol generator includes at least one designated symbol that is not initially associated with any of the symbol groups. In this embodiment, the designated symbol is a multiple win symbol such as a win all symbol 106*h*. When the gaming device generates one of the award symbols, the gaming device provides the player with the value of the award symbol. When the gaming device generates the designated symbol, the gaming device selects and associates the designated symbol with at least one of the symbol groups or section groups. The gaming device provides the player an accumulated award based on the award symbols of the group that is selected and associated with the designated symbol.

In the illustrated embodiment, the characteristics are letters and each of the sections that includes an award value includes a letter. The symbols or sections are grouped according to the associated letters. For example, section 104*a* and section 104*e* are associated with the same letter A and thus are in the A group. Sections 104*b*, 104*d* and 104*g* all have or are associated with the same letter B and thus are in the B group. Likewise, sections 104*c* and 104*f* each have the same characteristic denoted by the letter C and thus are in the C group.

In one embodiment, at least one of the sections 104*h* is designated as a multiple win section, which in the illustrated embodiment includes, displays or is associated with a win all symbol 106*h*. Unlike the other sections 104*a*, 104*b*, 104*c*, 104*d*, 104*e*, 104*f* and 104*g*, the designated section 104*h* is not initially associated with a characteristic. This section 104*h* does not initially display a letter. This designated section is operable to display the characteristics of all of the other sections when indicated. In this example, the win all section 104*h* is operable to display the letters A, B and C. When the wheel spins and stops to indicate the win all symbol, the win all section 104*h* sequentially displays or associates one, a plurality or all of the different letters with this designated section. The gaming device selects one of the letters to indicate or associate with the designated section. The gaming device provides this accumulated award to the player based on the characteristics of the group associated with the designated section.

Figure 3A:
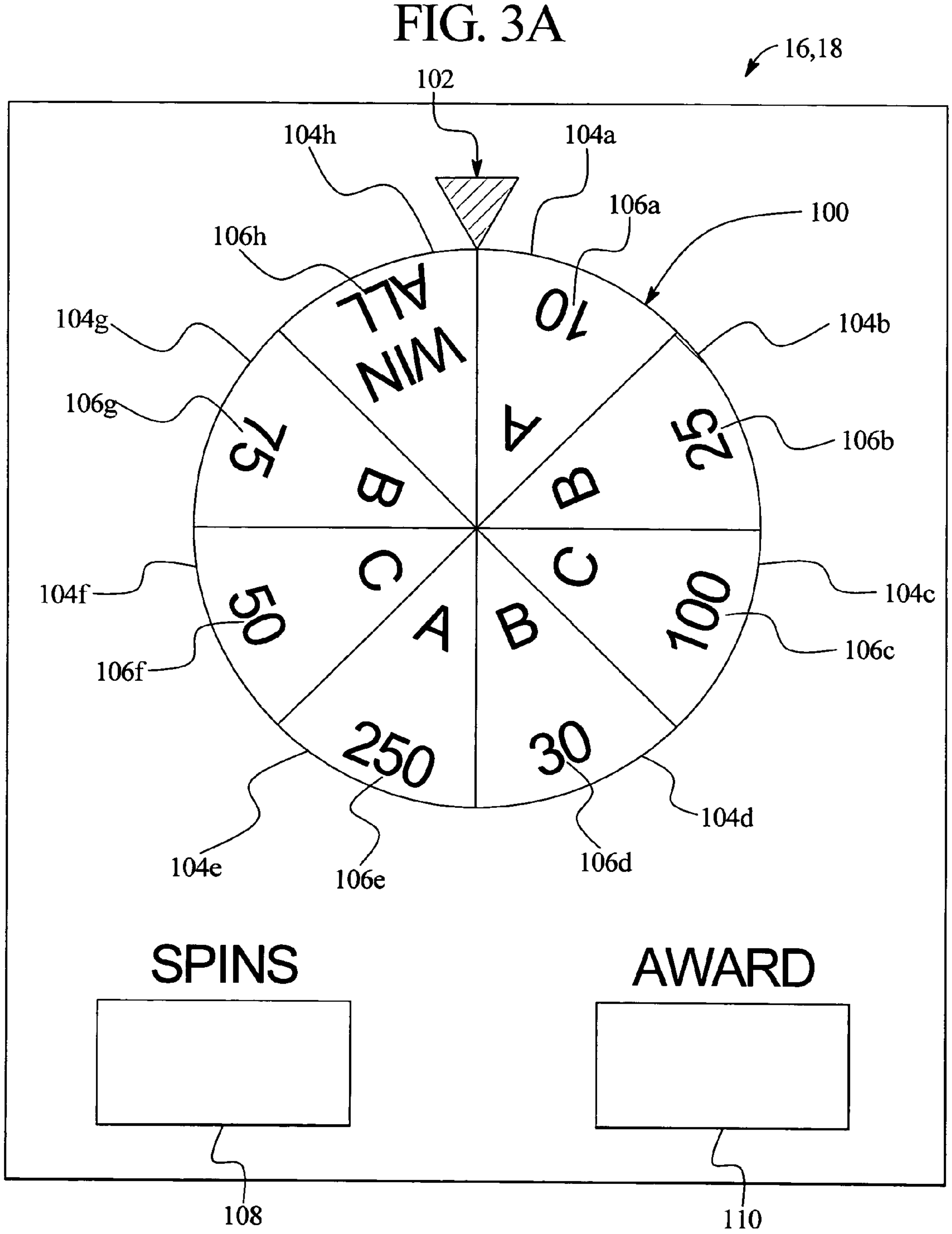
FIGS. 3A, 3B, 3C, 3D, 3E, 3F, 3G, 3H and 3I are front plan views of one symbol generator and indicator illustrating one of the sections changing characteristics to determine the accumulated award.
Figure 3B:
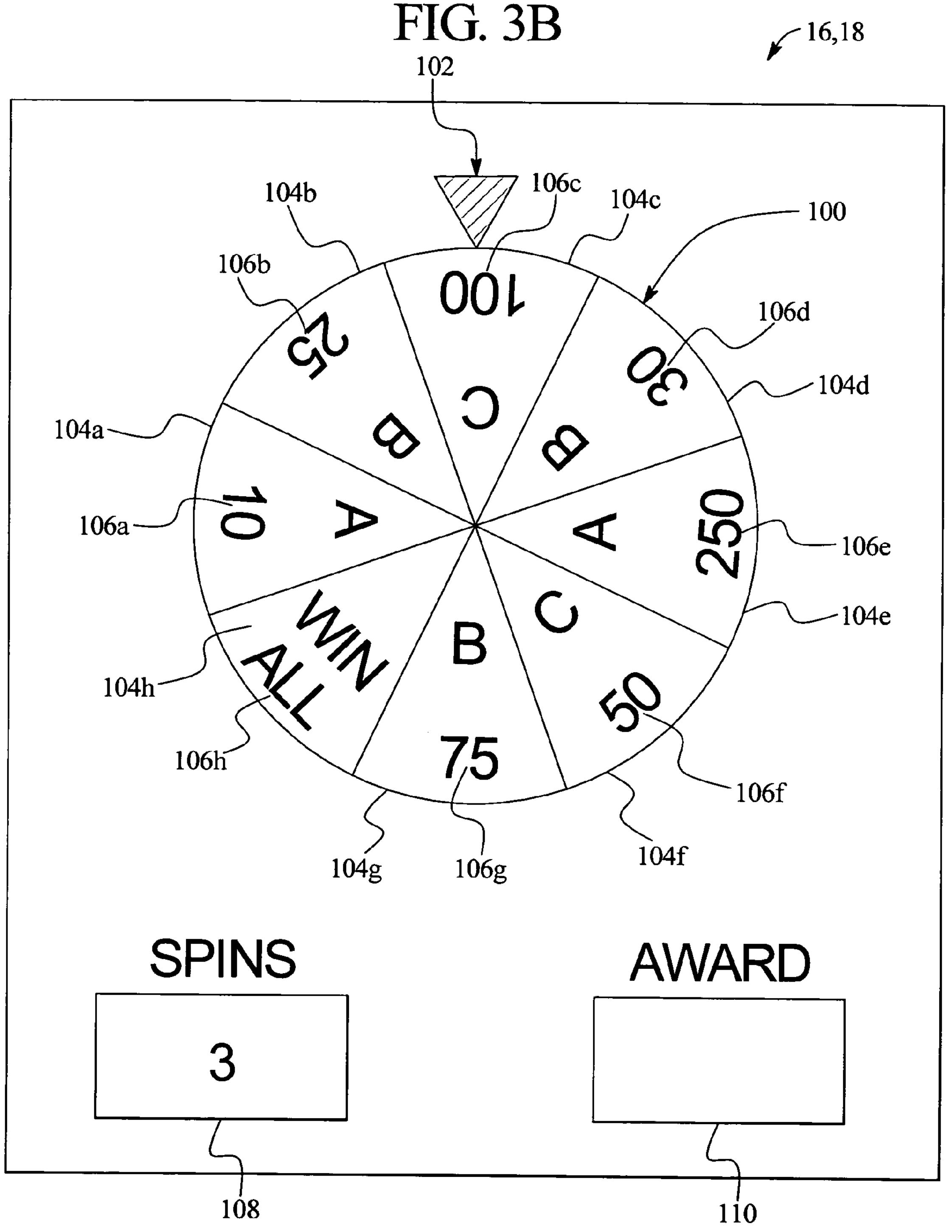
Figure 3C:
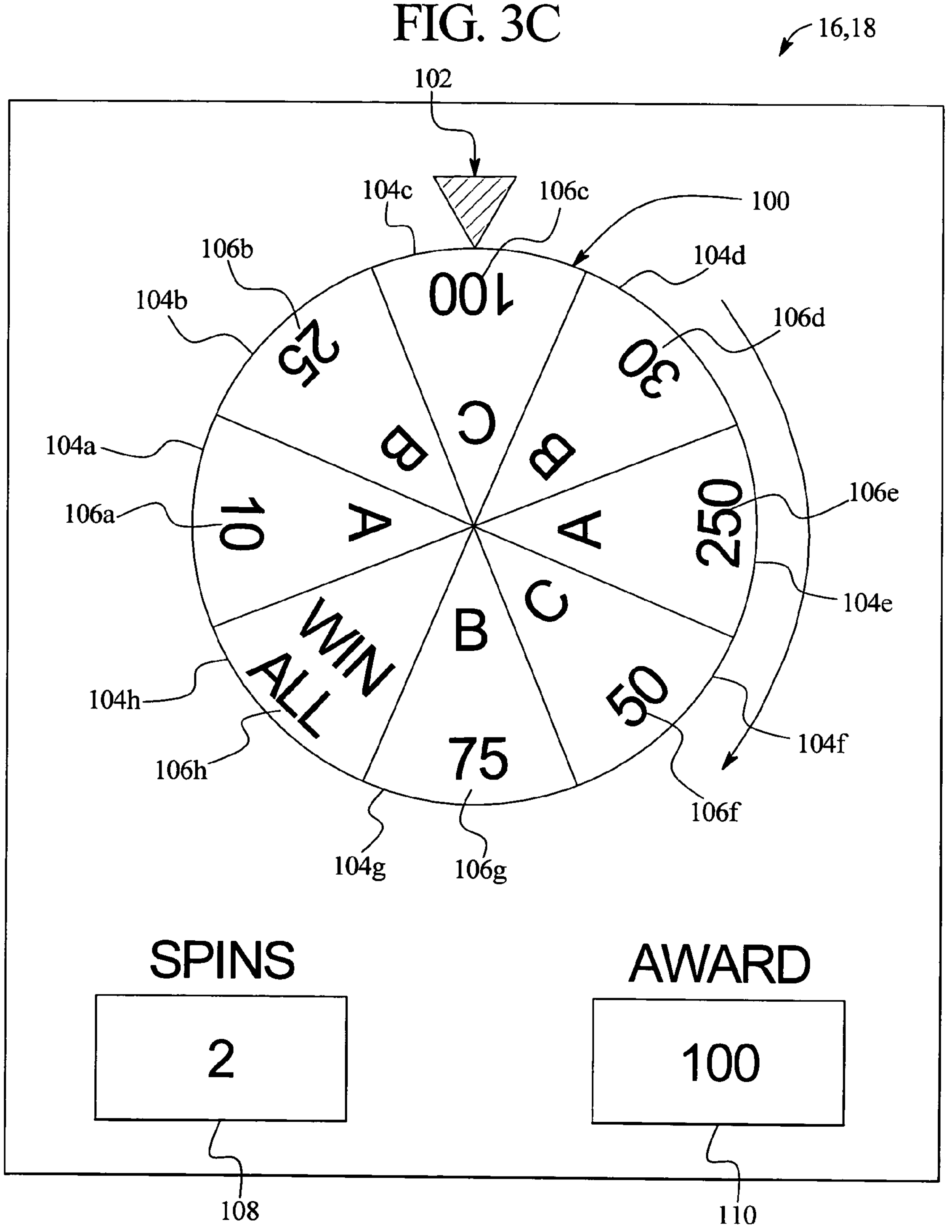

For example, as illustrated in FIG. 3B, the gaming device provides the player with three spins of the wheel. The display of the gaming device includes a number of spins display 108 and an award display 110. The number of spins display 108 includes a value of three indicating to the player that the player has three spins of the wheel. The award display does not have a value because the player has not been awarded any of the values or the awards of the wheel. The gaming device spins the wheel clockwise, automatically or upon an input by a player, to indicate one of the sections 104*c* and therefore one of the symbols, which in this example is the one hundred symbol 106*c*. As illustrated in FIG. 3C, the award display 110 now displays a value of one hundred and the number of spins display 108 now displays a value of two.

Figure 3D:
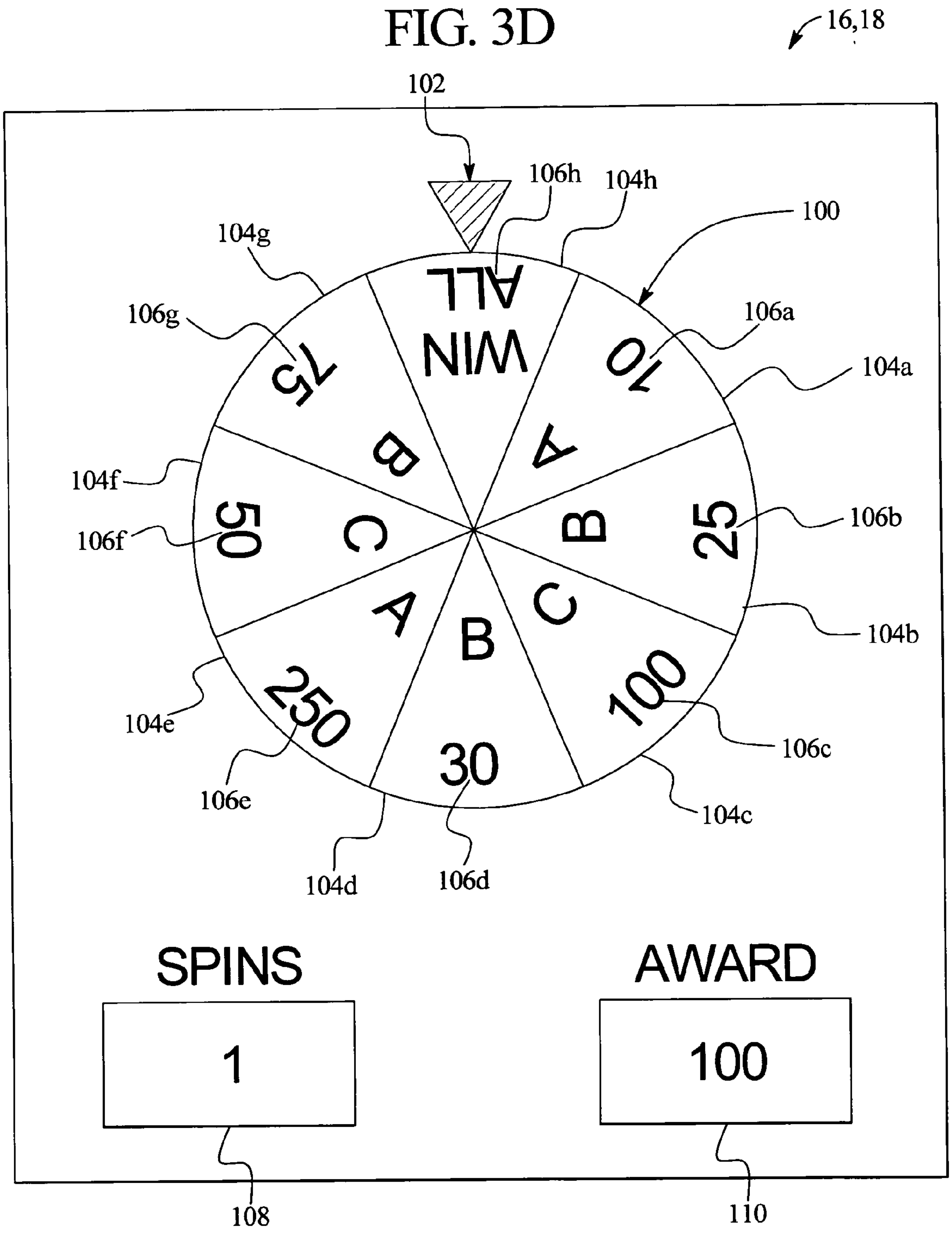

The gaming device spins the wheel again clockwise to stop to indicate another one of the symbols on the wheel. As illustrated in FIG. 3D, the gaming device stops rotating or spinning the wheel to indicate the designated win all symbol 106*h*. The number of spins display 108 now displays a value of one indicating to the player that the player only has one spin of the wheel left. The award display continues to display a value of one hundred from the first spin.

As previously discussed, the win all section is operable to alternately display the characteristics of all of the other sections of the wheel. The other sections each display or are associated with the letters A, B and C. When the gaming device indicates the win all symbol 106*h* or the win all section 104*h*, the designated section initially displays one of the letters associated with one of the other sections and continues rotating or displaying the other associated letters. It should be appreciated that the gaming device may cause the win all section to change or display the letters in any suitable manner.

Figure 3E:
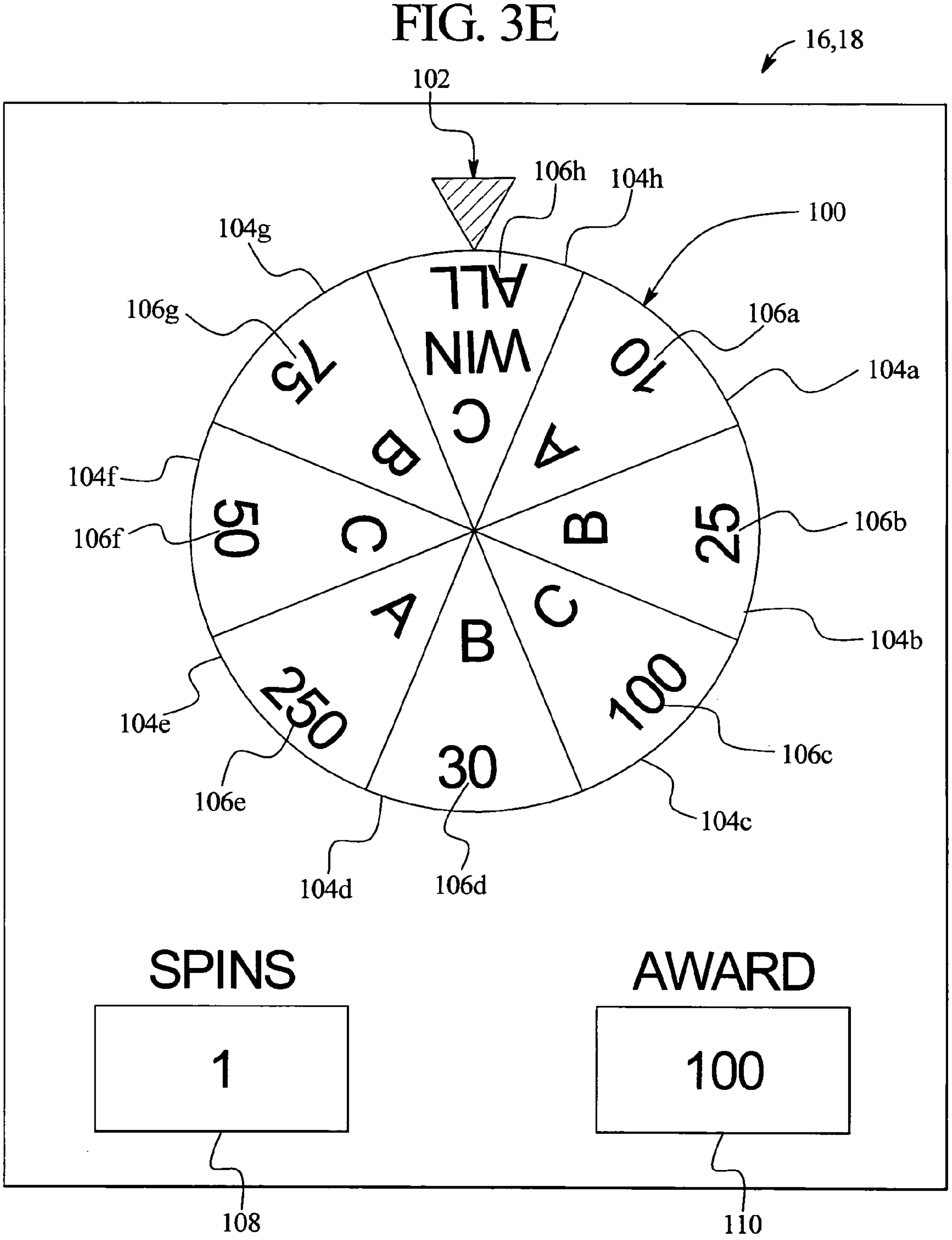

As indicated in FIG. 3E, the gaming device continues to indicate the win all symbol 106*h*. The gaming device causes the win all section to indicate letter C or the C group. Thus, if a gaming device were to stop changing the characteristic of the win all section, the gaming device would accumulate all of the other awards with the same characteristic as the win all section. For example, if the gaming device were to stop changing the group associated with the win all section, the gaming device would provide the player with all of the awards associated or displayed on these sections with letter C. As previously discussed, sections 104*c* and 104*f* are associated with display letter C and thus are in C group. Therefore, if the gaming device were to stop associating the designated section with symbol groups of the designated section, the gaming device would accumulate the award of one hundred fifty (which is the sum of the other awards in the C group) and provide that award to the player. In this embodiment, the gaming device continues to change the letter displayed by the win all section.

Figure 3F:
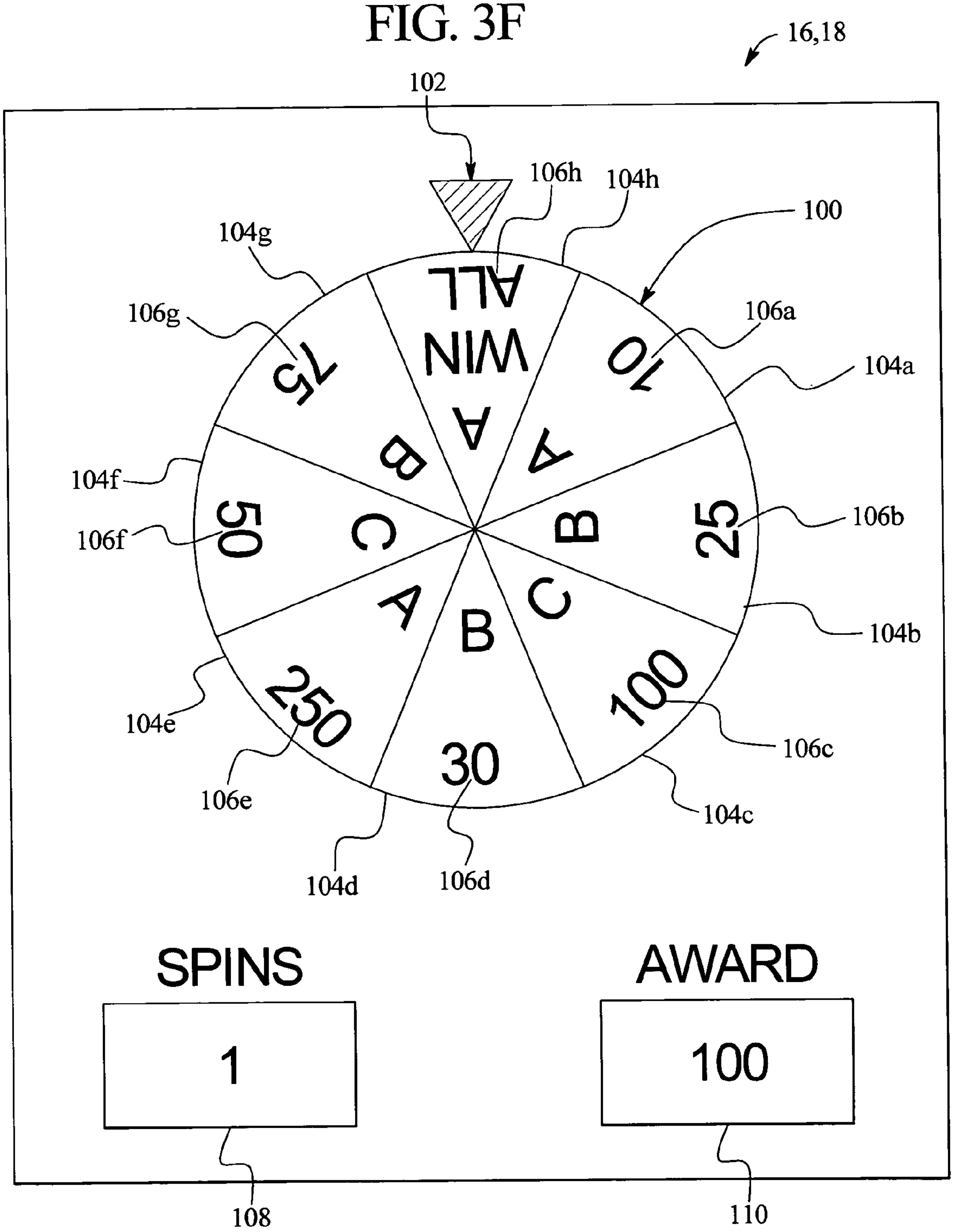
Figure 3G:
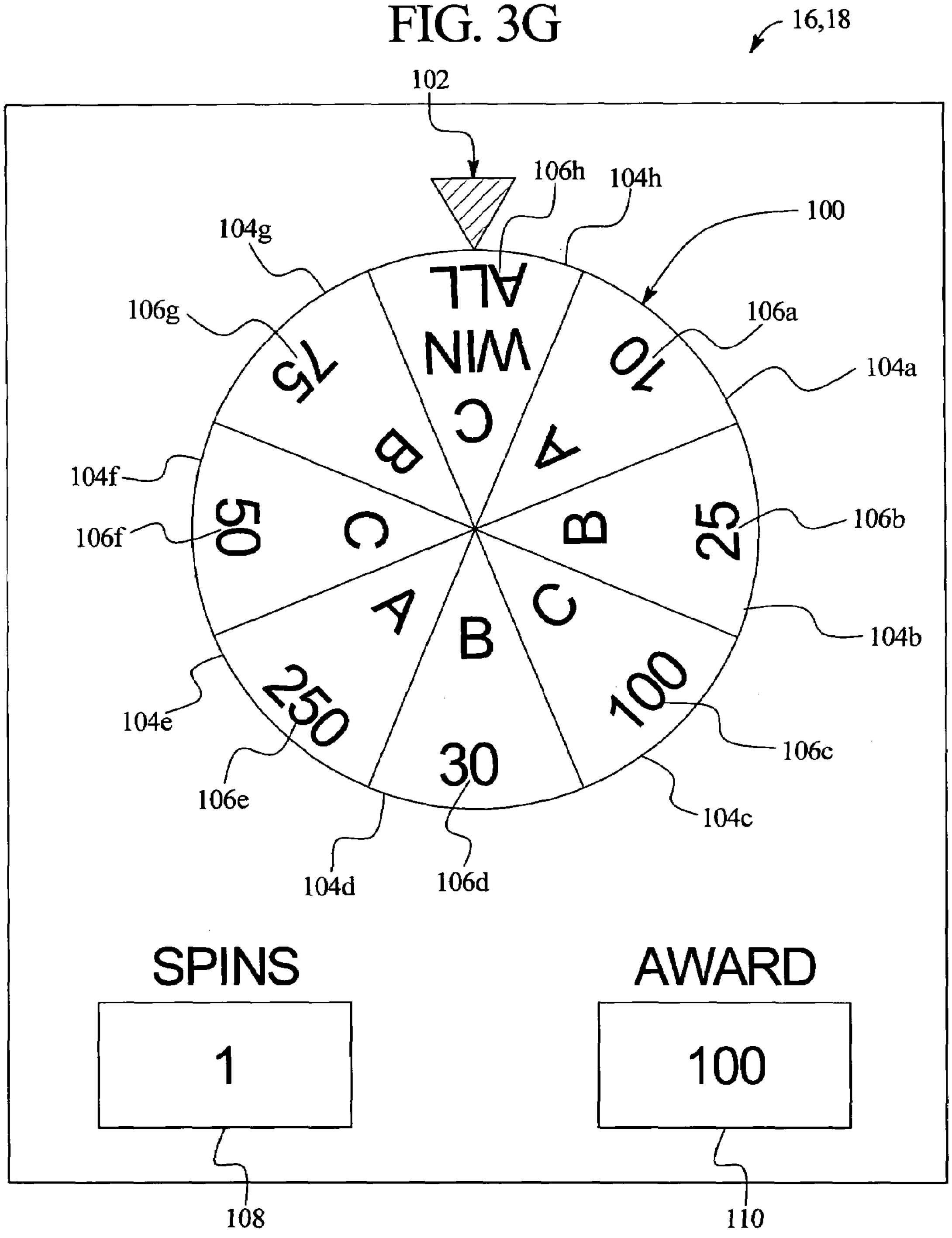

As illustrated in FIG. 3F, the gaming device changes the letter of the win all section to display letter A. Thus, if the gaming device were to stop changing the letter of the win all section, the gaming device would accumulate the values all of the sections which display letter A or in the A group. That is, the gaming device would provide the player with an award of two hundred sixty which is the sum of the ten symbol 106*a* and the two hundred fifty symbol 106*e*. However, the gaming device continues to change the letter of the win all section.

As illustrated in FIG. 3G, the gaming device again displays the letter C in the win all section. Thus, if the gaming device stops changing the letter of the win all section, the gaming device would accumulate all of the awards of the C group or that display the letter C. For example, the gaming device would accumulate the one hundred symbol 106*c* and the fifty symbol 106*f*. The accumulated award provided to the player in this example would be one hundred fifty. The gaming device continues to change the letter associated with the win all section.

Figure 3H:
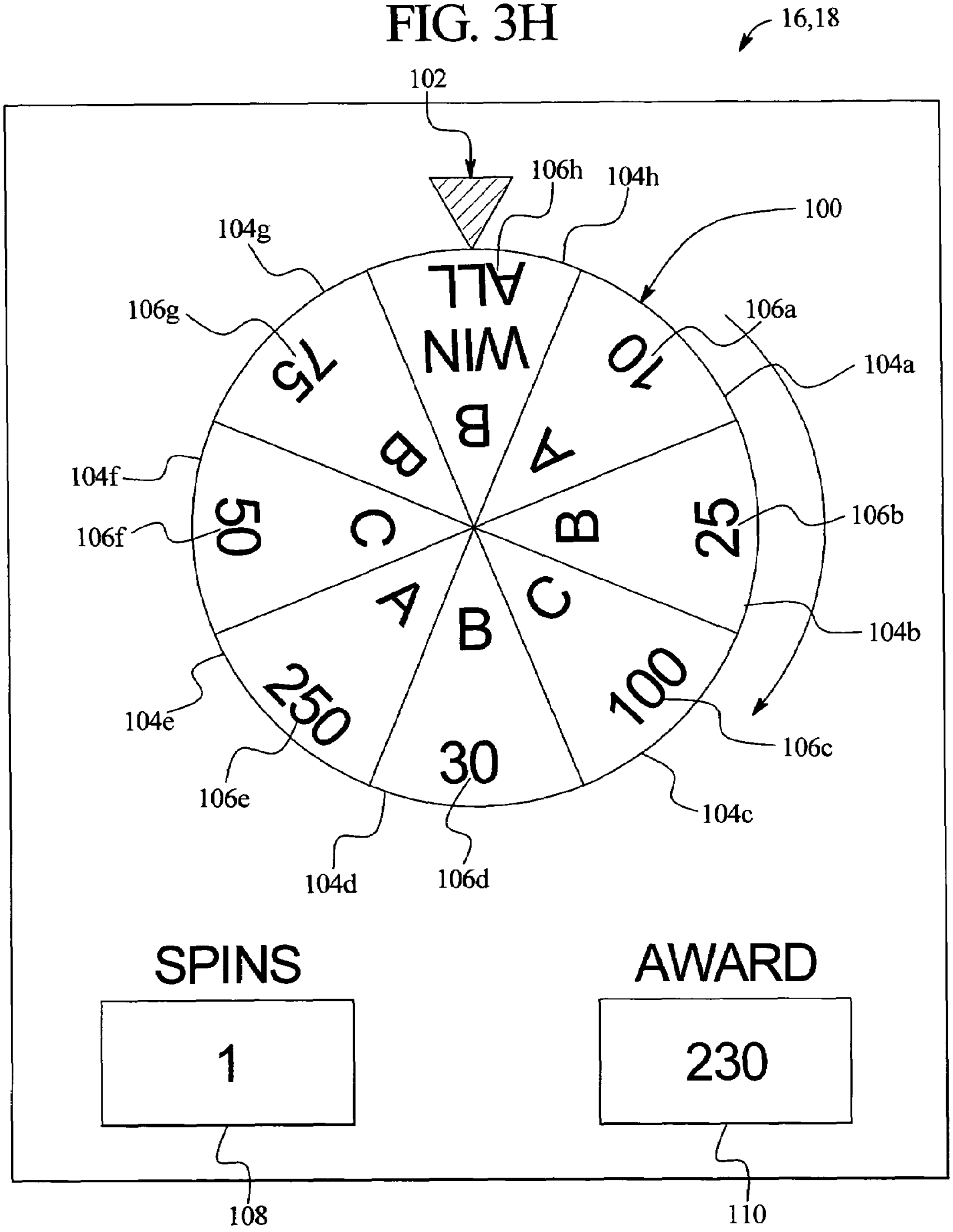

As illustrated in FIG. 3H, the gaming device now displays the letter B in the win all section. In this example, the gaming device stops changing the letter associated with the win all section. Therefore, the gaming device accumulates all of the awards with the letter B or in the B group. That is, the gaming device accumulates all of the values associated with the sections or symbols that are letter B or are in the B group. In this embodiment, the twenty-five symbol 106*b*, the thirty symbol 106*d* and the seventy-five symbol 106*g* are all associated with letter B or are in the B group. Therefore, the gaming device provides an accumulated award of one hundred thirty. As illustrated in FIG. 3H, the award display 110 now displays a value of two hundred thirty. The gaming device accumulates the one hundred value achieved in the first spin of the wheel and adds it to the award associated with the win all symbol of one hundred thirty. The number of spins display 108 displays a value of one indicating that the player still has one spin remaining in the game. As illustrated in FIG. 3H, the gaming device spins the wheel clockwise.

Figure 3I:
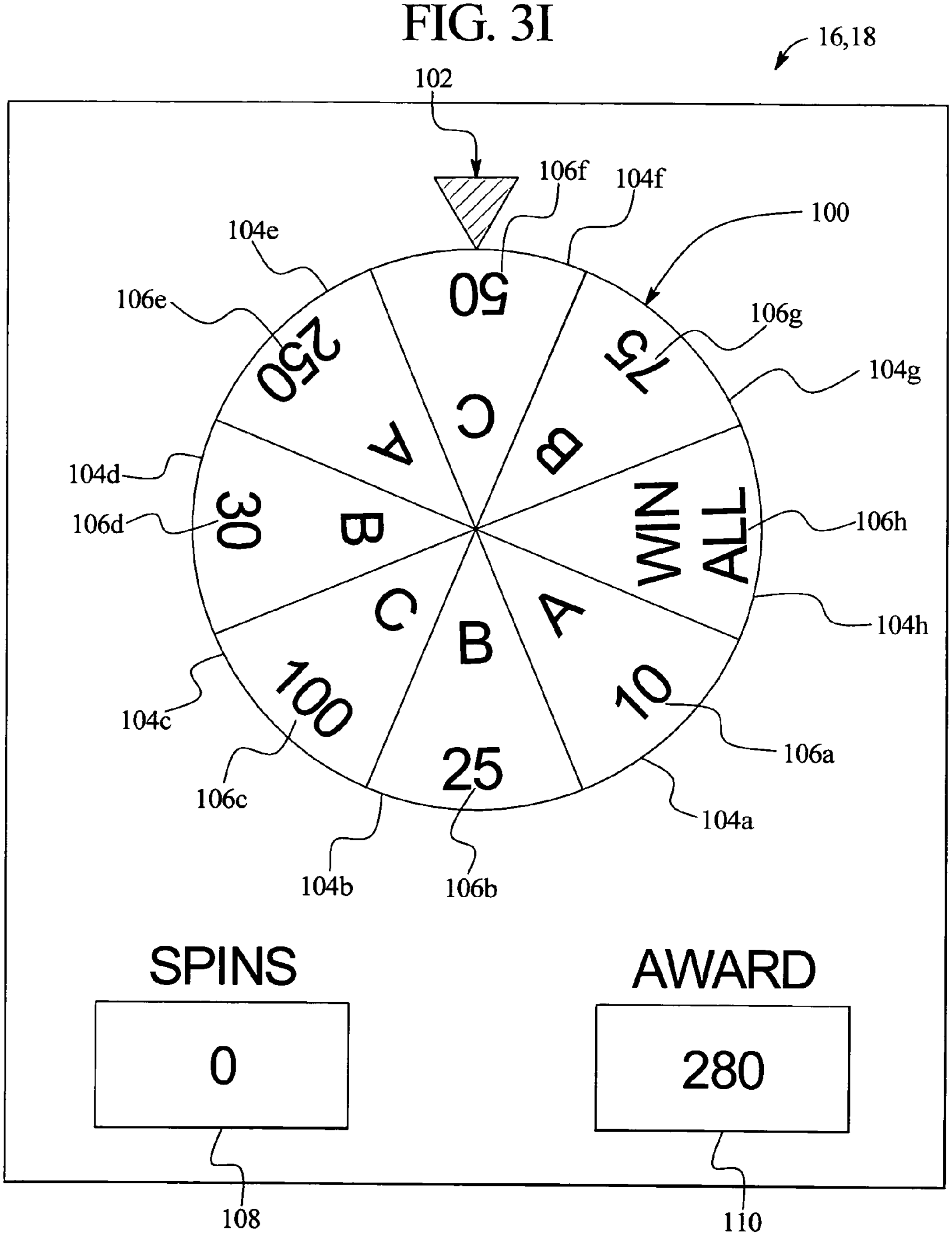

As illustrated in FIG. 3I, the gaming device stops rotating or spinning the wheel to indicate the fifty symbol 106*f*. The number of spins display of the gaming device 108 now displays a value of zero indicating to the player there are no spins remaining. The award display changes to indicate an award of two hundred eighty. The gaming device accumulates the awards from the first two spins, the values of one hundred and the one hundred thirty with the value of fifty from the final spin. In one embodiment, the game is over and the player wins an award of two hundred eighty monetary units or credits.

It should be appreciated that the accumulated award may be based on more than one characteristic. For example, the accumulated award may be based on the indicated letter and even numbered symbols. That is, in one embodiment, the accumulated award is only based on the symbols which are associated with the same letter which are even. In another example of this embodiment, the accumulated award may be based on two or more characteristics and include any symbols in the accumulated award that are associated with any of the characteristics. For example, the gaming device associates the designated section with a letter and the accumulated award is based on the designated letter and even numbered symbols. Thus, the gaming device provides an award based on any symbols which are associated with the designated letter or have an even number. It should be appreciated that symbols or characteristics may be used in any suitable manner to determine the accumulated award.

In one embodiment, the gaming device includes a second symbol generator behind the first symbol generator. In one embodiment, the second symbol generator displays and associates the characteristics with the designated section. For example, a gaming device includes a front symbol generator with a plurality of sections which display a numerical value and a letter. The front symbol generator includes a designated section including a transparent or translucent section. The back symbol generator includes a plurality of letters. When the gaming device indicates the designated section of the front symbol generator, the back symbol generator indicates or displays one or more symbols to a player through the transparent or translucent section of the symbol generator. The gaming device causes the back symbol generator to indicate one of the letters and determines the accumulated award based on this indicated letter. It should be appreciated that the gaming device may display or indicate one or more symbols or characteristics in any suitable manner.

In one embodiment, all or part of the designated section is transparent. It should be appreciated that the section may be constructed of any suitable transparent material in one embodiment. In one embodiment, gaming device includes a plurality of multi-colored light emitting diodes ("LED's") behind the wheel. In one embodiment, this multi-colored LED display is behind the entire wheel and large enough to illuminate the entire wheel. In another embodiment, the multi-colored LED display is large enough to illuminate only one of the sections. The multi-colored LED display is operable to change colors to display any of the other colors of the other displayed sections. Though it should be appreciated that the gaming device may illuminate or indicate the designated characteristic in any suitable manner.

In one embodiment, the gaming device includes a plurality of LED's around the wheel. This LED light ring highlights or indicates the winning sections. In one embodiment, the LED light ring highlights the sections in the color designated by the win all symbol when it is indicated and stops changing colors. In another embodiment, the gaming device highlights or illuminates the perimeter of the winning sections associated with the accumulated award when the designated section is indicated.

In another embodiment, the gaming device includes a transparent symbol generator such as a transparent wheel. Each of the sections includes or is associated with a value symbol. Each of the sections are operable to display a characteristic. It should be appreciated that the characteristic may be any suitable characteristic. In this embodiment, the characteristics are colors which for illustration purposes are represented by alphabetical symbols.

Figure 4A:
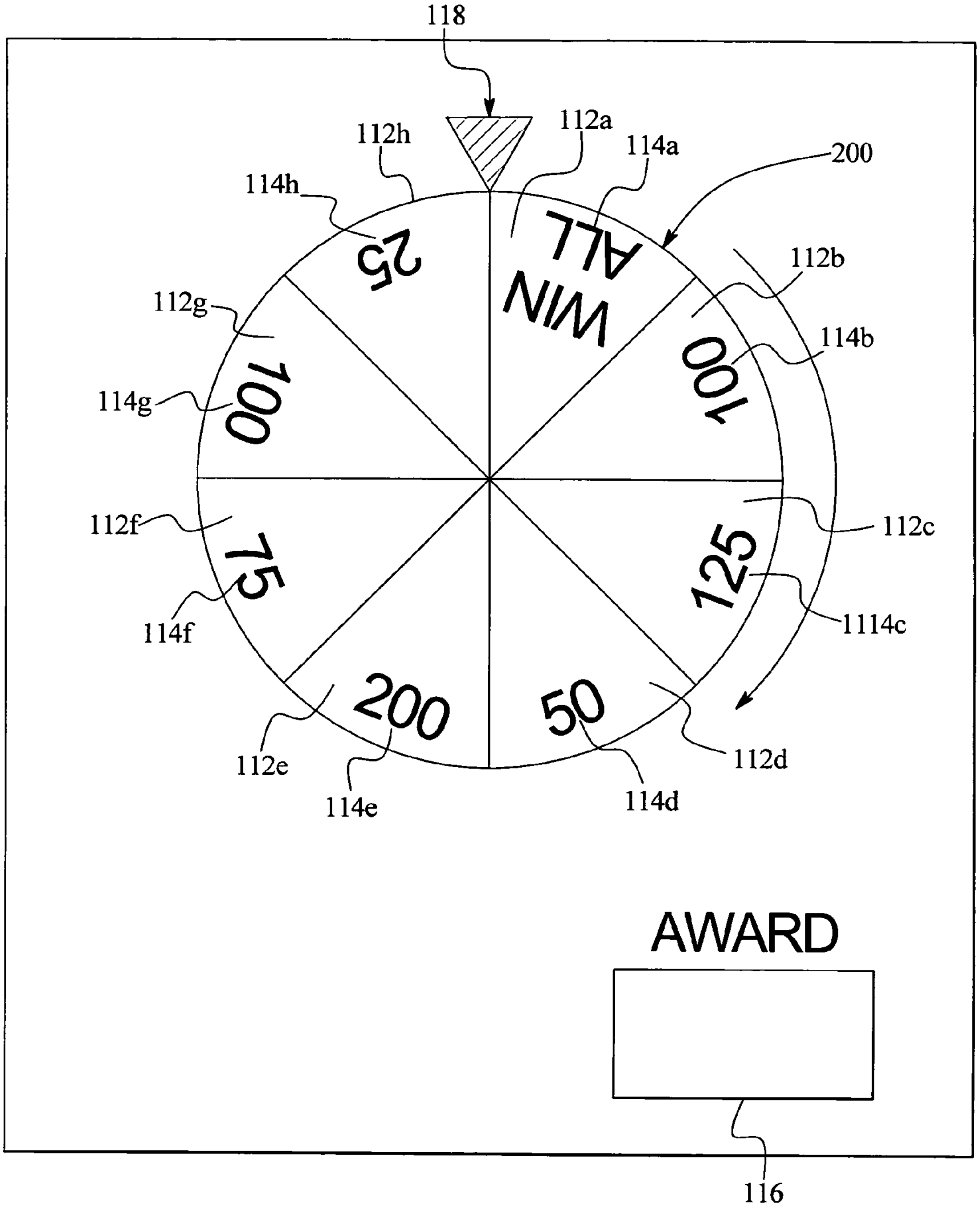
FIGS. 4A, 4B, 4C, 4D, 4E, 4F and 4G are front plan views of the display device of one embodiment of the present invention, wherein the display device displays a transparent wheel and player selectable selections and generally illustrates the different sections of the wheel changing colors.

As illustrated in FIG. 4A, the wheel includes a plurality of adjacently arranged sections 112*a*, 112*b*, 112*c*, 112*d*, 112*e*, 112*f*, 112*g* and 112*h*. Each of the sections includes, displays or is associated with a first characteristic which is a symbol 114*a*, 114*b*, 114*c*, 114*d*, 114*e*, 114*f*, 114*g* and 114*h*. The wheel is made of any type of suitable transparent material. At least one of the sections 112*a* is a designated section. In this embodiment, the designated section is associated with or displays a multiple win symbol such as win all symbol 114*a*. When the gaming device indicates the win all symbol or the win all section the gaming device determines an accumulated award based on the characteristic of the other sections. In this embodiment, the characteristics are colors. For illustration purposes, the colors are represented by letters, wherein the letter A represents a first color, color A, the letter B represents another color, color B. Likewise, the letter C represents the color C and the letter D represents a different color, color D. The gaming device provides an indicator 118 and an award display 116.

Figure 4B:
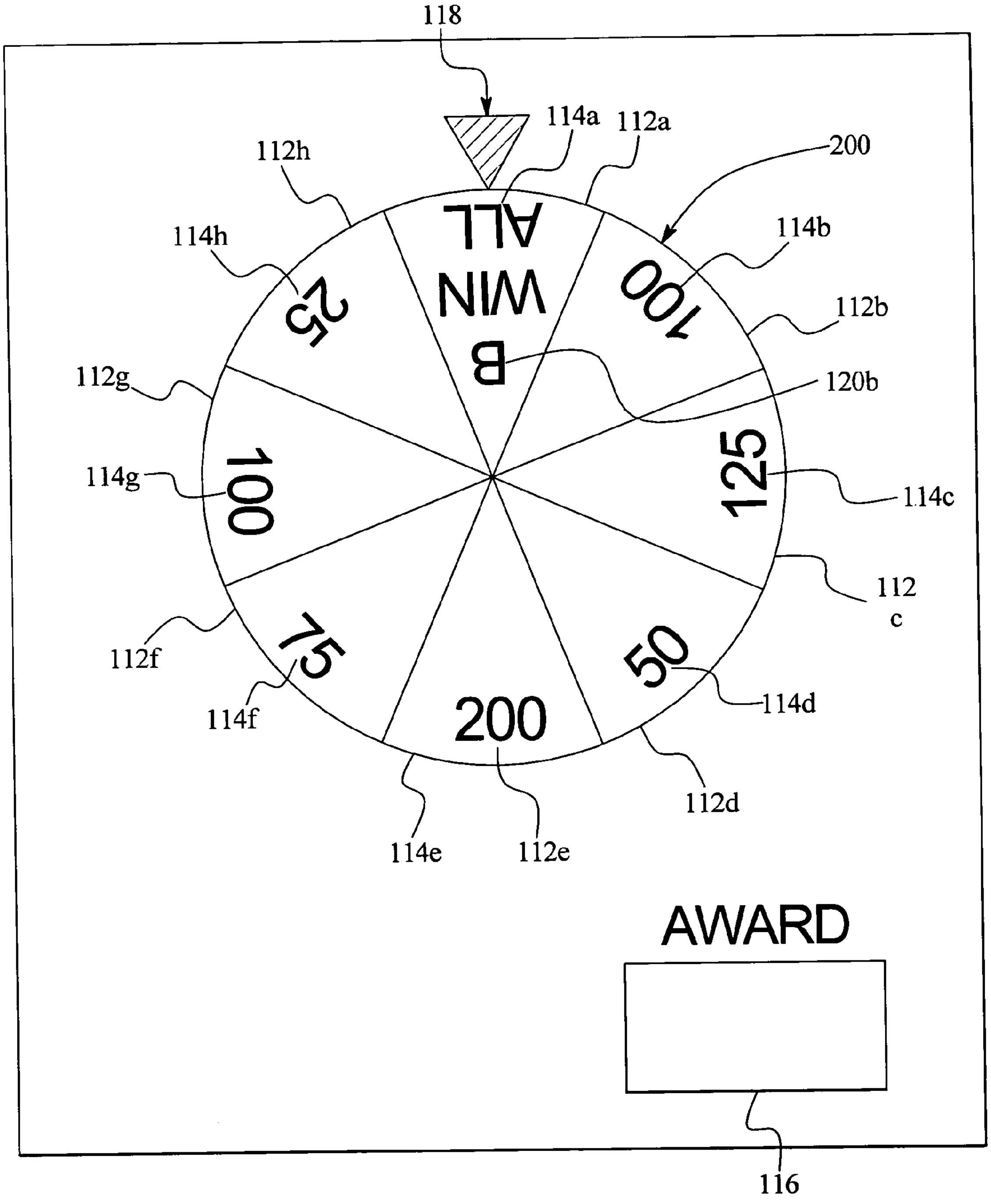
Figure 4C:
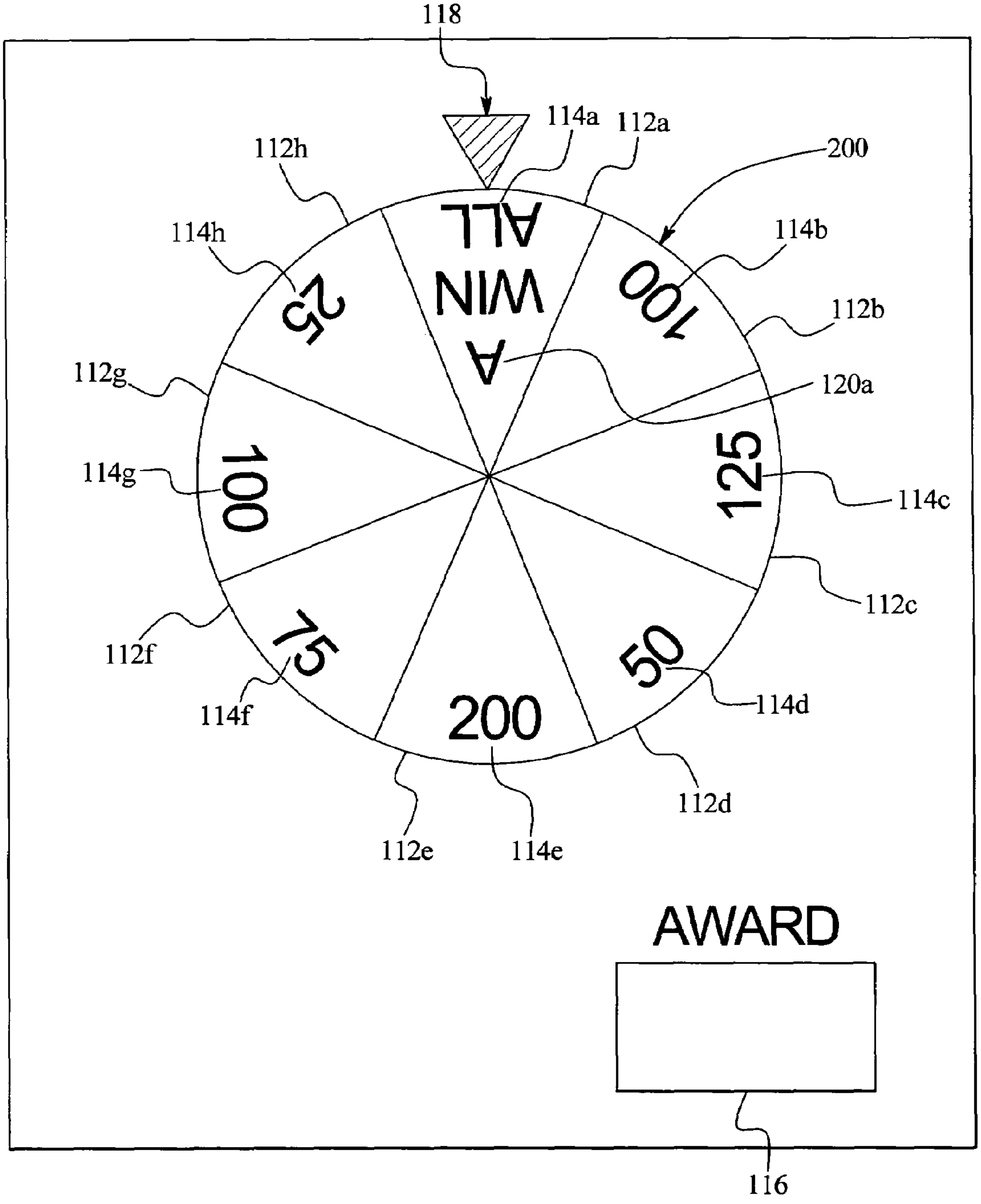
Figure 4D:
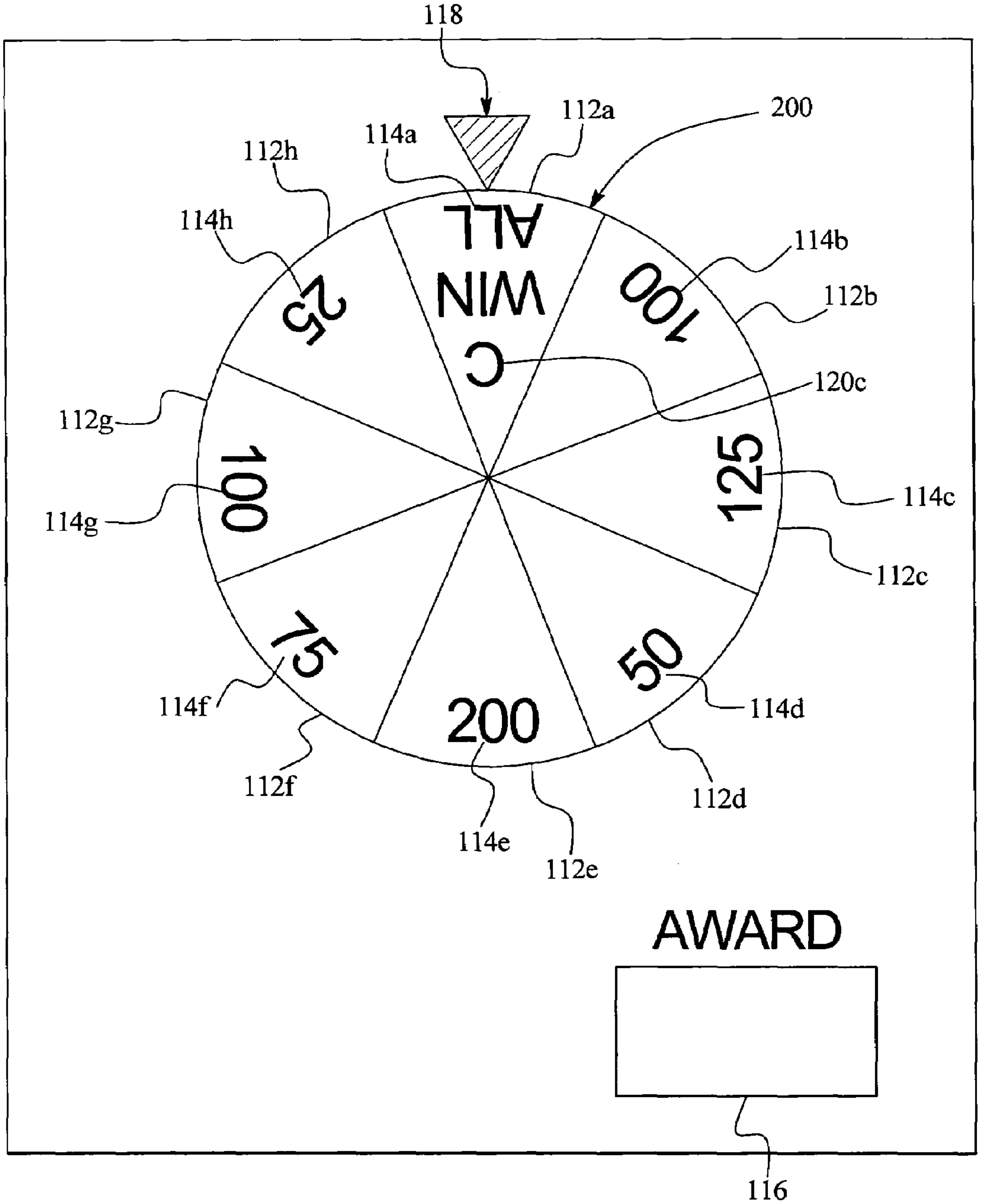

The gaming device, automatically or upon player input, spins the wheel as illustrated in FIG. 4A. As illustrated in FIG. 4B, the gaming device indicates the win all symbol 114*a* or the section 114*a* associated with the win all symbol. In this embodiment, the entire wheel is associated with a plurality of LED's. In one embodiment, the LED's are located on a wheel adjacent to the wheel. In one embodiment, the LED wheel moves with the top wheel. In another embodiment, the LED's do not move with the wheel but are a fixed display under the wheel. The gaming device illuminates the LED's associated with or underneath the win all section 114*a* to display the color B 120*b*. As illustrated in FIG. 40, the gaming device changes the colors of the LED's to color A 120*a*. As illustrated in FIG. 4D, the gaming device changes the color of the LED's associated with the win all section 114*a* to color C 120*c*. It should be appreciated that in this embodiment, the other sections of the wheel are not illuminated or indicated during the time that the win all section 114*a* changes colors. The gaming device stops changing the colors of the LED's and keeps the display of color C. Therefore, color C is the characteristic that determines the accumulated award. The gaming device accumulates the values displayed or associated with all of the other color C sections after colors are determined for each of the sections.

Figure 4E:
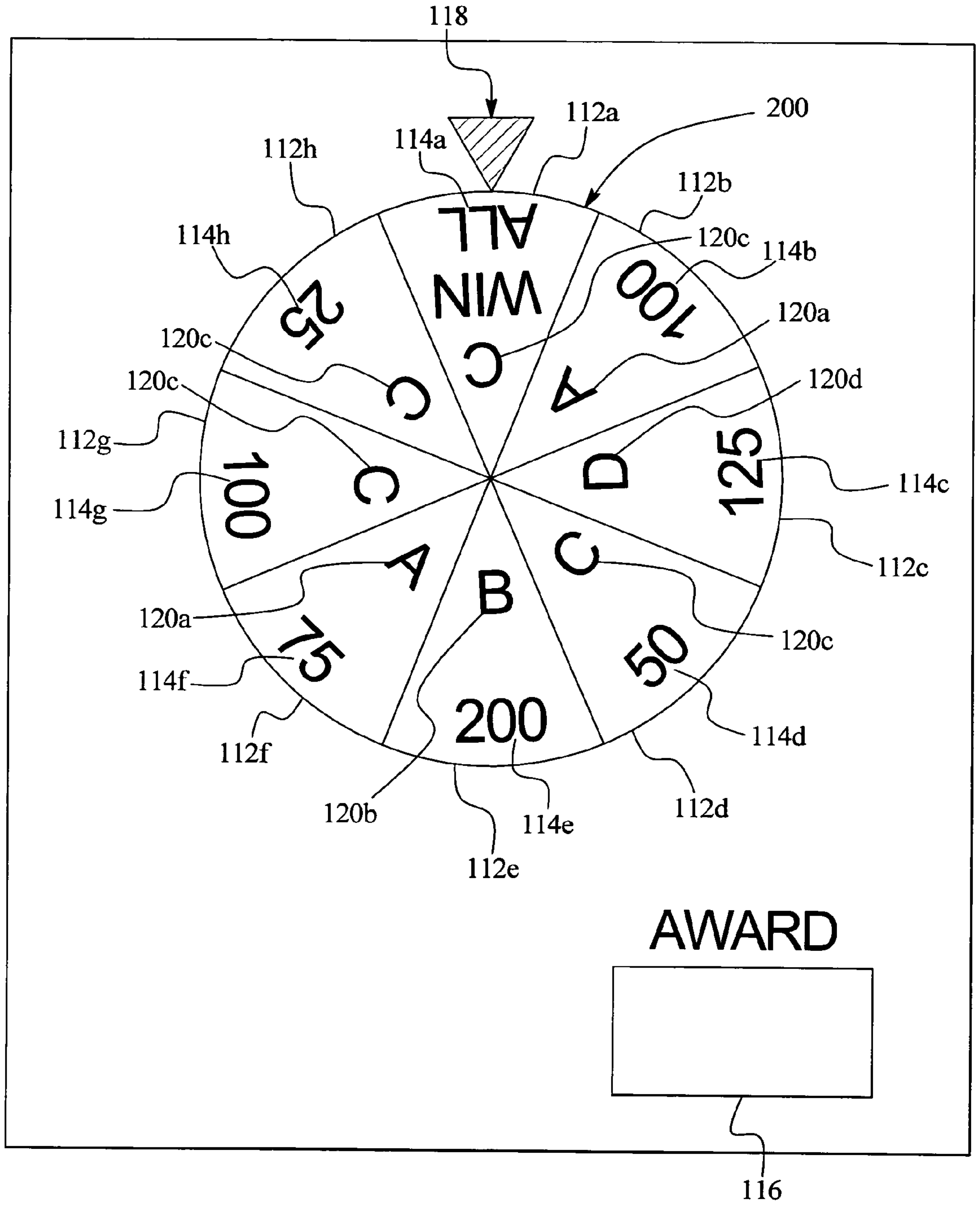

As illustrated in FIG. 4E, the gaming device illuminates each section of the wheel in one of the colors, color A, color B, color C, or color D. In this embodiment, the gaming device simultaneously illuminates all of the sections in one of the colors. In another embodiment, the gaming device illuminates or changes the color of one section at a time. As illustrated in FIG. 4E, the gaming device changes the colors of a plurality of the sections 112*b* and 112*f* to color A illustrated by the letter A 20*a*. The gaming device changes the colors of one of the sections 112*c* to color D 120*d*, illustrated by the letter D 120*d*. The gaming device changes the color of three of the sections 112*d*, 112*g* and 112*h* to color C, illustrated by the letter C 120*c*. The gaming device changes one of the sections 112*e* to color B 120*b*, illustrated by the letter B 120*b*.

In this example, if the gaming device did not continue changing the colors of the sections the gaming device would accumulate all of the values associated with the color C or the C group sections because the win all section is color C. That is, the gaming device accumulates all of the values of the sections with the characteristic that match the characteristic of the win all section. However, the gaming device continues to tease the player by changing the colors of the sections associated with numerical values 112*b* to 112*h* while continuing to display the color C for the win all section 112*a.*

Figure 4F:
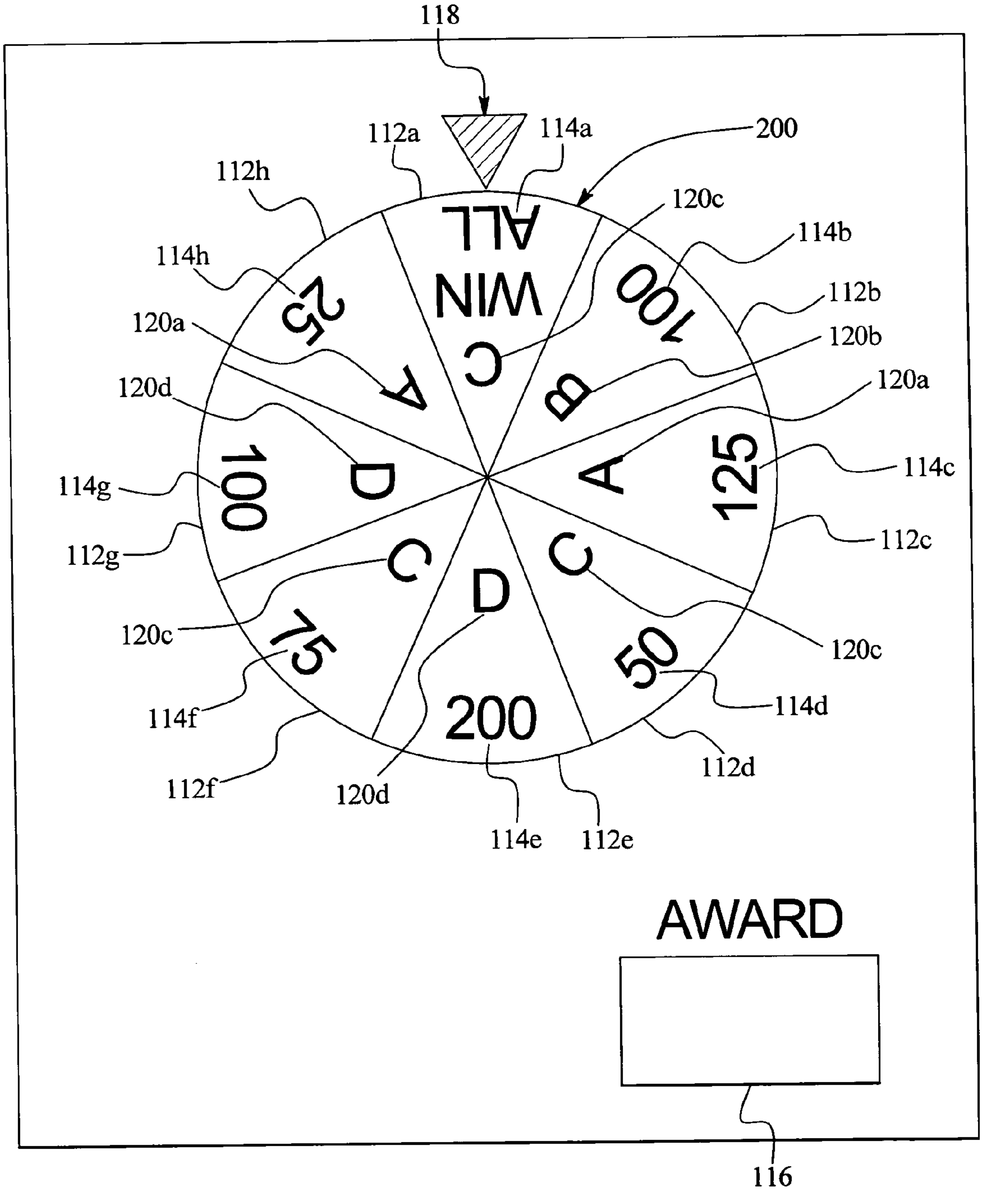

As illustrated in FIG. 4F, the gaming device changes the color of one or more of the sections. The gaming device changes one of the sections to color B 114*b*, two of the sections to color A 112*c*, 112*h*, two of the sections to color C 112*d* and 112*f* and two of the sections to color D 112*e*, 112*g*. If the gaming device stopped changing the color of the sections, it would provide the player with an award of 125 monetary units or credits. However, the gaming device continues to change the colors of the sections as illustrated in FIG. 4G.

Figure 4G:
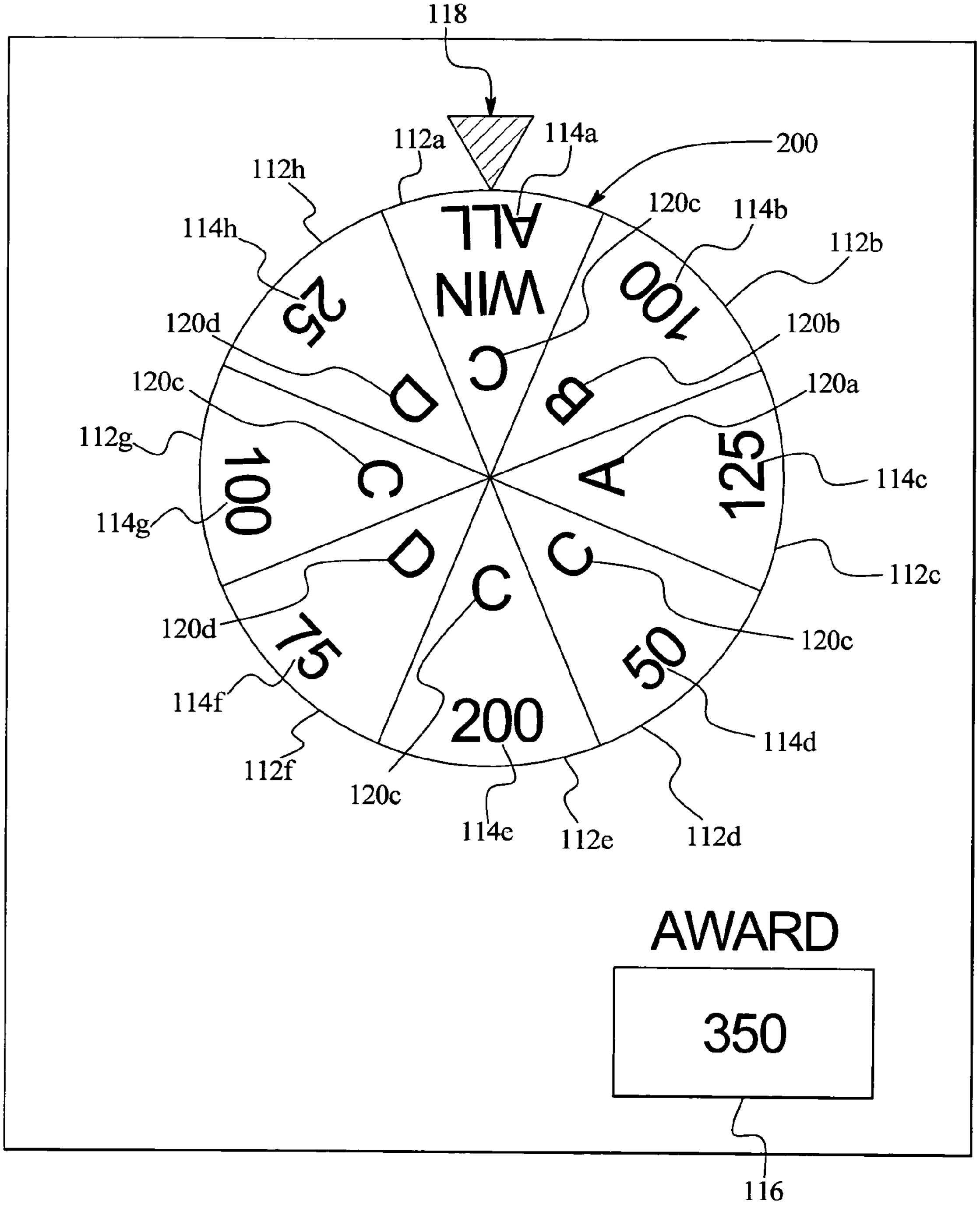

The gaming device changes the colors of the sections displaying numerical values a final time, as illustrated in FIG. 4G. The section 112*d* associated with the 50 symbol 114*d* is changed to color C. The section 112*e* associated with the 75 symbol 114*e* is color C and the section associated with the 100 symbol 114*g* is color C. Therefore, the gaming device accumulates the values associated with or displayed by the color C sections, which is 350 and provides the player with the award.

It should be appreciated that the gaming device may provide the player with any suitable number of spins of the wheel. The number of spins provided to the player may be based on any suitable game event or function. In one embodiment, the symbol generator game is part of a secondary game and the primary game determines a certain number of spins to provide to the player. It should be appreciated that the gaming device may provide a predetermined number of spins. It should also be appreciated that the gaming device may randomly enable the player to spin the wheel again. In one embodiment, at least one of the symbols on the wheel is associated with a terminating function or sequence that causes the game to end. In another embodiment, the gaming device ends the game when it indicates the multiple win or win all symbol or section. It should be appreciated that the gaming device may end the game in any suitable manner.

In another embodiment, the designated section is not associated with a characteristic. Rather, in this embodiment, the gaming device includes a symbol generator which includes a plurality of adjacent sections which each are associated with a plurality of characteristics. It should be appreciated that there may be any suitable number of characteristics and that the characteristic may be any suitable characteristic. The gaming device includes at least one section which is not associated with a characteristic or is associated with a characteristic which is different from all of the other characteristics. That is, the symbol generator includes at least one section that is associated with a characteristic by itself, and therefore, does not include a characteristic that corresponds to any of the other characteristics. When the gaming device spins the symbol generator and indicates this designated section which does not have a characteristic corresponding to any of the other characteristics, the gaming device may indicate how the accumulated award will be determined in any number of ways. In one embodiment of this example, the gaming device causes the indicator of the symbol generator to display one of the characteristics associated with the other sections. In one embodiment, the characteristic is color and each of those sections are associated with a color. The gaming device thus causes the indicator to change colors and to stop changing colors to indicate which color is used to determine the accumulated award. For example, the sections are associated with or display the colors red, green and blue. When the gaming device stops the wheel to indicate the designated symbol or section, the designated section does not change color but remains its original color. The indicator includes an LED display or any other suitable form of display which causes the indicator to change from green, blue and red in any suitable manner or any suitable number of times. When the indicator stops changing colors, the last color indicated determines which of these sections is used to determine the accumulated award.

It should be appreciated that the symbols are not limited to award symbols and win all symbols but may be any suitable symbol. The symbols may include free spin symbols, lose a spin symbols or any other functional game symbols. It should also be appreciated that the characteristic is not limited to color. It should be appreciated that the symbol generator may be any suitable symbol generator, such as but not limited to any suitable mechanical symbol generator. It should be appreciated that the symbol generator may not be mechanical but may be displayed by a video device.

The characteristics may be any suitable type of characteristics, including but not limited to shapes, colors, sizes, patterns, symbols or any other suitable characteristic. Therefore, the designated section or the designated symbol would not be limited to a change in color, but the gaming device may change the win all symbol to display any type of suitable characteristic. In one embodiment, the characteristics are locations of the symbols. In this embodiment, the symbols on the sections are in a plurality of different locations. The gaming device changes the position of the accumulated award symbol and stops changing it to designate a symbol position. The gaming device provides an accumulated award with the values associated with any of the sections with the same symbol position as the accumulated award position. It should be appreciated that the first and second characteristics or the symbols and characteristics may be any suitable symbol or characteristic.

In one embodiment, the LED display is stationary and it is a suitable size and in a suitable location to change the color of the designated symbol or section. In an alternative embodiment, the LED's are located directly behind the designated section and attached to the wheel. That is, when the wheel moves, the LED display moves with it.

It should be appreciated that the gaming device may indicate any suitable number of symbols or values. It should be appreciated that the award may be determined in any suitable manner. The award indicated to the player is not limited to a number of monetary units or credits, but may indicate any suitable award, such as a point accumulation for the game. It should be appreciated that the symbol generator may be any suitable symbol generator operable to generate any suitable symbol.

In one embodiment, the gaming device spins the wheel automatically. In another embodiment, the player is enabled to initiate the spinning of the wheel by pressing or actuating any number of player inputs. In one embodiment, the number of picks provided to the player is determined by the amount of the wager. In another embodiment, the number of picks by the player is determined by an event in a base game.

While the present invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the claims. It is thus to be understood that modifications and variations in the present invention may be waived without departing from the novel aspects of this invention as defined in the claims, and that this application is only to be limited by the scope of the claims.

The invention is claimed as follows:

1. A gaming device comprising:

at least one display device including a base game display and a circular symbol generator located above the base game display;

at least one input device;

at least one processor; and a memory device which stores a plurality of instructions, which when executed by the at least one processor, cause the at least one processor to determine a designated multiple win section of the symbol generator before each play of a game and cause the at least one processor to operate with the at least one display device and the at least one input device for each play of the game to:

(a) cause the symbol generator to move to indicate one of a plurality of sections of the symbol generator, said plurality of sections including a plurality of non-designated sections and the designated multiple win section that remains designated for the play of the game, wherein each of a plurality of symbols is associated with at least one of the sections;

(b) cause the symbol generator to stop moving;

(c) cause an indicator to indicate one of the sections;

(d) if the designated multiple win section is indicated:

(i) determine one of a plurality of characteristics to associate with the indicated designated multiple win section, (ii) associate at least one of the characteristics with the indicated designated multiple win section, (iii) cause an indication of the determined characteristic of the indicated designated multiple win section, (iv) determine an association of each of a plurality of the sections with one of the characteristics, and (v) determine an award based on the sections associated with the characteristic associated with the indicated designated multiple win section; and (e) provide a player with an outcome based on the symbol associated with the indicated section, wherein if said indicated section is said designated multiple win section, provide the player with the determined award.

2. The gaming device of claim 1, wherein when executed by the at least one processor, the plurality of instructions cause the at least one processor to operate with the at least one display device and the at least one input device to cause a display of said characteristics associated with each of the sections after the symbol generator stops moving and indicates the designated multiple win section.

3. The gaming device of claim 1, wherein when executed by the at least one processor, the plurality of instructions cause the at least one processor to operate with the at least one display device and the at least one input device to indicate one of the characteristics for each of the sections after a plurality of the characteristics are associated with the indicated designated multiple win section.

4. The gaming device of claim 1, wherein said symbol generator is a mechanical wheel configured to rotate about an axis.

5. The gaming device of claim 1, which includes repeating (a) to (e) a predetermined number of times.

6. The gaming device of claim 1, wherein said characteristics are colors and wherein the gaming device includes a plurality of light emitting diodes configured to produce the colors.

7. The gaming device of claim 1, wherein when executed by the at least one processor, the plurality of instructions cause the at least one processor to operate with the at least one display device and the at least one input device to cause an illumination of the sections after the symbol generator stops moving to produce the plurality of characteristics.

8. The gaming device of claim 1, which includes a second symbol generator, wherein when executed by the at least one processor, the plurality of instructions cause the at least one processor to operate with the at least one display device and the at least one input device to cause the second symbol generator to display an association of at least one of the characteristics with the indicated designated multiple win section and to cause an indication of the determined characteristic of the designated multiple win section if the designated multiple win section is indicated.

9. The gaming device of claim 1, wherein when executed by the at least one processor, the plurality of instructions cause the at least one processor to operate with the at least one display device and the at least one input device to cause the association of each of a plurality of the sections with one of the characteristics before causing the indication of one of the sections.

10. The gaming device of claim 1, wherein when executed by the at least one processor, the plurality of instructions cause the at least one processor to operate with the at least one display device and the at least one input device to cause the association of each of a plurality of the sections with one of the characteristics after causing the indication of one of the sections.

11. A gaming device comprising:

at least one display device including a base game display and a circular symbol generator located above the base game display;

at least one input device;

at least one processor; and a memory device which stores a plurality of instructions, which when executed by the at least one processor, cause the at least one processor to determine at least one designated multiple win section the symbol generator before each play of a game and cause the at least one processor to operate with the at least one display device and the at least one input device for each play of the game to:

(a) cause the symbol generator to move, wherein said symbol generator includes a plurality of sections and each of a plurality of symbols is associated with at least one of the sections, said plurality of sections including a plurality of non-designated sections and the at least one designated multiple win section, wherein the at least one designated multiple win section remains designated for the play of the game;

(b) cause the symbol generator to stop moving;

(c) cause an indication of at least one of the sections with an indicator;

(d) if the at least one designated multiple win section is indicated:

(i) determine one of a plurality of characteristics to associate with the indicator, (ii) cause a display and an association of the determined characteristics with the indicator, (iii) cause of indication of the determined characteristic of the indicator, (iv) determine an association of each of a plurality of the sections with one of the characteristics, and (v) determine an award based on symbols of the sections associated with the characteristic associated with the indicator; and (e) provide a player with an outcome based on the symbol associated with the indicated section, wherein if said indicated section is said at least one designated multiple win section, provide the player with the determined award.

12. The gaming device of claim 11, wherein a plurality of the sections display one of the characteristics.

13. The gaming device of claim 11, wherein a plurality of the sections are configured to display a plurality of the characteristics and when executed by the at least one processor, the plurality of instructions cause the at least one processor to operate with the at least one display device and the at least one input device to then cause the sections to each indicate each indicate each one of the characteristics.

14. The gaming device of claim 11, wherein when executed by the at least one processor, the plurality of instructions cause the at least one processor to operate with the at least one display device and the at least one input device to cause the association of each of a plurality of the sections with one of the characteristics before causing the indication of one of the sections.

15. The gaming device of claim 11, wherein when executed by the at least one processor, the plurality of instructions cause the at least one processor to operate with the at least one display device and the at least one input device to cause the association of each of a plurality of the sections with one of the characteristics after causing the indication of one of the sections.

16. A gaming device comprising:

at least one display device including a base game display and a circular symbol generator located above the base game display;

at least one input device;

at least one processor; and a memory device which stores a plurality of instructions, which when executed by the at least one processor, cause the at least one processor to determine a designated multiple win section of the symbol generator before each play of a game and cause the at least one processor to operate with the at least one display device and the at least one input device for each play of the game to:

(a) cause an indication of at least one of a plurality of symbols of the symbol generator with an indicator, wherein the symbol generator includes a plurality of sections, said plurality of sections including a plurality of non-designated sections and the designated multiple win section, wherein the designated multiple win section remains designated for the play of the game;

(b) if the designated multiple win section is indicated by the indicator:

(i) determine at least one of a plurality of characteristics to associate with the designated multiple win section, (ii) display and associate at least one of the characteristics with the designated multiple win section, (iii) indicate the at least one determined characteristic associated with the designated multiple win section, (iv) determine an association of each of a plurality of the sections with one of the characteristics, and (v) determine an award based, at least in part, on the sections associated with at least one of the characteristics associated with the designated multiple win section; and (c) provide a player with an outcome based on the symbol associated with the indicated section, wherein if said indicated section is said designated multiple win section, provide the player with the determined award.

17. The gaming device of claim 16, wherein when executed by the at least one processor, the plurality of instructions cause the at least one processor to operate with the at least one display device and the at least one input device to cause a display of said characteristics associated with each of the sections after the indication of at least one of the symbols.

18. The gaming device of claim 16, when executed by the at least one processor, the plurality of instructions cause the at least one processor to operate with the at least one display device and the at least one input device to cause an indication of one of the characteristics for each of the sections after the association of a plurality of characteristics with the designated multiple win section.

19. The gaming device of claim 16, which includes repeating (a) to (c) a predetermined number of times.

20. The gaming device of claim 16, wherein said characteristics are colors and which includes a plurality of light emitting diodes configured to produce the colors.

21. The gaming device of claim 16, which includes a second symbol generator, wherein the second symbol generator is configured to display at least one of the characteristics in association with the designated multiple win section and to indicate the determined characteristic of the designated section if the designated section is indicated.

22. The gaming device of claim 16, when executed by the at least one processor, the plurality of instructions cause the at least one processor to operate with the at least one display device and the at least one input device to cause the association of each of a plurality of the sections with one of the characteristics before causing the indication of one of the sections.

23. The gaming device of claim 16, when executed by the at least one processor, the plurality of instructions cause the at least one to operate with the at least one display device and the at least one input device to cause the association of each of a plurality of the sections with one of the characteristics after causing the indication of one of the sections.

24. A method for operating a gaming device including a plurality of instructions and including a display device that includes a base game display and a circular symbol generator located above the base game display, said method comprising:

(a) providing the symbol generator for a play of a game, wherein the symbol generator includes a plurality of sections, said plurality of sections including a plurality of non-designated sections and a designated multiple win section, wherein the designated multiple win section is determined before each play of the game, and the designated multiple win section remains designated for the play of the game;

(b) causing a processor to execute said plurality of instructions to associate at least one of a plurality of symbols with each of a plurality of the sections;

(c) causing the processor to execute said plurality of instructions to cause the symbol generator to move to indicate one of the sections;

(d) causing the processor to execute said plurality of instructions to cause the symbol generator to stop moving;

(e) indicating one of the sections with an indicator;

(f) if the designated multiple win section is indicated:

(i) causing the processor to execute said plurality of instructions to determine one of a plurality of characteristics to associate with the designated multiple win section, (ii) displaying at least one of the characteristics in association with the designated multiple win section, (iii) indicating the determined characteristic of the designated multiple win section, (iv) causing the processor to execute said plurality of instructions to determine an association of each of a plurality of the sections with one of the characteristics, and (v) causing the processor to execute said plurality of instructions to determine an award based on the sections associated with the characteristic associated with the indicated multiple win section; and (g) providing a player with an outcome based on the symbol associated with the indicated section, wherein if said indicated section is said designated multiple win section, providing the player with the determined award.

25. The method of claim 24, which includes displaying said characteristics associated with each of the sections after the symbol generator stops moving and indicates the designated multiple win section.

26. The method of claim 24, which includes indicating one of the characteristics for each of the sections after the association of said determined characteristic with the designated multiple win section.

27. The method of claim 24, which includes repeating (a) to (g) a predetermined number of times.

28. The method of claim 24, wherein said characteristics are colors.

29. The method of claim 24, which includes illuminating the sections after the symbol generator stops moving to produce the plurality of characteristics.

30. The method of claim 24, which includes associating each of a plurality of the sections with one of the characteristics before indicating one of the sections.

31. The method of claim 24, which includes associating each of a plurality of the sections with one of the characteristics after indicating one of the sections.

32. A method of operating a gaming device including a plurality of instructions and including a display device that includes a base game display and a circular symbol generator located above the base game display, said method comprising:

(a) providing a plurality of symbol groups for a play of a game;

(b) for the play of the game, providing a plurality of symbols on the symbol generator which include designated multiple win symbols and non-designated symbols, wherein the designated multiple win symbols are determined before each play of the game and are designated for the play of the game, wherein each of the non-designated symbols are each associated with at least one of the symbol groups based on said symbols;

(c) causing a processor to execute said plurality of instructions to associate each of a plurality of the non-designated symbols with one of a plurality of awards and with an indicator for the play of the game, (d) causing the processor to execute said plurality of instructions to select at least one of the symbols for the play of the game and cause an indication of said at least one selected symbol for the play of the game;

(e) if said at least one selected symbol is one of the designated multiple win symbols:

(i) causing the processor to execute said plurality of instructions to determine an association of at least one of the symbol groups with the indicated designated multiple win symbol, and (ii) causing the processor to determine a designated award based on all of the awards associated with the symbols of any of the symbol groups associated with the designated multiple win symbol; and (f) providing a player with any awards associated with the at least one indicated symbol for the play of the game, wherein if one of said designated multiple win symbols is indicated, providing the player with the designated award.

33. The method of claim 32, which includes displaying the association of the at least one symbol groups with the designated multiple win symbol.

34. The method of claim 32, wherein if said designated multiple win symbol is indicated, basing said designated award on more than one of the symbol groups.

35. The method of claim 24, wherein a plurality of the symbols are in more than one symbol group.

36. The method of claim 32, which includes repeating (a) to (e) a predetermined number of times.

* * * * *

UNITED STATES PATENT AND TRADEMARK OFFICE

CERTIFICATE OF CORRECTION

PATENT NO. : 7,591,723 B2
APPLICATION NO. : 10/956222
DATED : September 22, 2009
INVENTOR(S) : Cregan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this

Twenty-first Day of September, 2010

David J. Kappos

David J. Kappos
*Director of the United States Patent and Trademark Office*